(12) United States Patent
Kubota

(10) Patent No.: US 8,503,723 B2
(45) Date of Patent: Aug. 6, 2013

(54) HISTOGRAM-BASED OBJECT TRACKING APPARATUS AND METHOD

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 12/848,908

(22) Filed: Aug. 2, 2010

(65) Prior Publication Data

US 2011/0033085 A1 Feb. 10, 2011

(30) Foreign Application Priority Data

Aug. 6, 2009 (JP) ................................ 2009-183629

(51) Int. Cl.
*G06K 9/00* (2006.01)

(52) U.S. Cl.
USPC ............................ 382/103; 382/168; 382/170

(58) Field of Classification Search
None
See application file for complete search history.

(56) References Cited

U.S. PATENT DOCUMENTS

| 6,700,999 | B1 * | 3/2004 | Yang | 382/118 |
|---|---|---|---|---|
| 2010/0045800 | A1 * | 2/2010 | Chebil et al. | 348/169 |
| 2011/0033086 | A1 * | 2/2011 | Kubota | 382/103 |

FOREIGN PATENT DOCUMENTS

| EP | 666696 A2 | 8/1995 |
|---|---|---|
| JP | 2004-348273 A | 12/2004 |
| JP | 2004348273 A * | 12/2004 |
| WO | 99/28759 A1 | 6/1999 |

OTHER PUBLICATIONS

Perez et al., "Color-Based Probabilistic Tracking", 2002, Computer Vision Lecture Notes in Computer Science, vol. 2350/2002, p. 661-675.*
Comaniciu et al., "Kernel-based object tracking", May 2003, IEEE Transactions on Pattern Analysis and Machine Intelligence, vol. 25, iss. 5, p. 564-577.*

* cited by examiner

*Primary Examiner* — Stephen R Koziol
*Assistant Examiner* — Timothy Choi
(74) *Attorney, Agent, or Firm* — Canon U.S.A., Inc. IP Division

(57) ABSTRACT

An apparatus includes a storage unit configured to store an attribute of each pixel existing inside a tracking target area set on an image and an attribute of a pixel existing adjacent to the pixel, an allocation unit configured to allocate an evaluation value to a pixel to be evaluated according to a result of comparison between an attribute of the pixel to be evaluated and an attribute of a pixel existing inside the tracking target area and a result of comparison between an attribute of a pixel existing adjacent to the pixel to be evaluated and an attribute of a pixel existing adjacent to the pixel existing inside the tracking target area, and a changing unit configured to change the tracking target area based on the allocated evaluation value.

18 Claims, 19 Drawing Sheets

FIG.6A

| 400 | | Num | | Ratio [%] | |
|---|---|---|---|---|---|
| | | In | Out | | |
| Hue | 0°~ | 2 | 13 | 15 | Pink |
| | 40°~ | | | | |
| | 80°~ | 3 | 86 | 3 | Yellow |
| | 120°~ | 2 | 230 | 1 | Green |
| | 160°~ | | | | |
| | 200°~ | | | | |
| | 240°~ | 1 | 56 | 2 | Blue2 |
| | 280°~ | | | | |
| | 320°~ | | | | |

FIG.6B

| 420 | | In Ave. | | | |
|---|---|---|---|---|---|
| | | Y | Chroma | Hue | |
| Hue | 0°~ | 130 | 47 | 36 | Pink |
| | 40°~ | | | | |
| | 80°~ | 153 | 55 | 113 | Yellow |
| | 120°~ | 147 | 23 | 140 | Green |
| | 160°~ | | | | |
| | 200°~ | | | | |
| | 240°~ | 121 | 18 | 245 | Blue2 |
| | 280°~ | | | | |
| | 320°~ | | | | |

FIG.7A

| 440 | | Num | | Ratio [%] | |
|---|---|---|---|---|---|
| | | In | Out | | |
| Y | 0~ | 1 | 0 | 100 | Black0 |
| | 40~ | 11 | 80 | 13 | Black1 |
| | 80~ | | | | |
| | 120~ | | | | |
| | 160~ | 2 | 241 | 1 | Gray2 |
| | 200~ | 3 | 93 | 3 | White |
| | 240~ | | | | |

FIG.7B

| 480 | | In Ave. | |
|---|---|---|---|
| | | Y | |
| Y | 0~ | 13 | Black0 |
| | 40~ | 41 | Black1 |
| | 80~ | | |
| | 120~ | | |
| | 160~ | 165 | Gray2 |
| | 200~ | 210 | White |
| | 240~ | | |

FIG.8A

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.8B

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.8C

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.8D

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.9A

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.9B

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.9C

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.9D

| Blue 1 | Blue 1 | Blue 1 | Gray 1 | Gray 1 | Gray 1 | Blue 1 |
|---|---|---|---|---|---|---|
| Blue 1 | Blue 2 | Gray 2 | Black 1 | Black 1 | Black 1 | Gray 1 |
| Blue 2 | Gray 2 | Black 1 | Black 0 | Black 1 | Black 1 | Yellow |
| Pink | Pink | Pink | Black 1 | Black 1 | Yellow | Yellow |
| Green | Green | White | Black 1 | Black 1 | Yellow | Yellow |
| Green | Green | White | White | Black 1 | Yellow | Yellow |
| Green | White | White | White | Black 1 | Black 1 | Black 1 |

FIG.10
500

| Hue | Chroma | | | Adjacent Chromatic Color (Hue) | | | | | | | | | | | | Adjacent Achromatic Color (Colorless) | | | | | | |
|---|---|---|---|---|---|---|---|---|---|---|---|---|---|---|---|---|---|---|---|---|---|---|
| | 0~ | 45~ | 90~ | 0~ | 40~ | 80~ | 120~ | 160~ | 200~ | 240~ | 280~ | 320~ | 0~ | 60~ | 120~ | 180~ | 240~ | 0~ | 40~ | 80~ | 120~ | 160~ | 200~ | 240~ |
| 0~ (Pink) | 1 | 6 | | 3 | | | 3 | | | 1 | | | | 7 | | | | 1 | 4 | | | 2 | 2 | |
| 40~ | | | | | | | | | | | | | | | | | | | | | | | | |
| 80~ (Yellow) | | 12 | | | | 12 | | | | | | | | | 12 | | | | 12 | | | | | |
| 120~ (Green) | 7 | 3 | | 3 | | | 7 | | | | | | | | 10 | | | | | | | | | 6 |
| 160~ | | | | | | | | | | | | | | | | | | | | | | | | |
| 200~ (Blue2) | 1 | 3 | | | | | | | | 1 | 4 | | | | 5 | | | | 1 | | | 2 | | |
| 240~ | | | | | | | | | | | | | | | | | | | | | | | | |
| 280~ | | | | | | | | | | | | | | | | | | | | | | | | |
| 320~ | | | | | | | | | | | | | | | | | | | | | | | | |

| Y | Adjacent Chromatic Color (Color) | | | | | | | | | | | | | | Adjacent Achromatic Color (Colorless) | | | | | | | |
|---|---|---|---|---|---|---|---|---|---|---|---|---|---|---|---|---|---|---|---|---|---|---|
| | Chroma | | | Hue | | | | | | | | | Y | | | | Y | | | | | | |
| | 0~ | 45~ | 90~ | 0~ | 40~ | 80~ | 120~ | 160~ | 200~ | 240~ | 280~ | 320~ | 0~ | 60~ | 120~ | 180~ | 240~ | 0~ | 40~ | 80~ | 120~ | 160~ | 200~ | 240~ |
| 0~ | 1 | 1 | | | | | | | | | | | | | 1 | | | 6 | 6 | | | 1 | | | Black0
| 40~ | 3 | 16 | | | | 11 | | | | 1 | 2 | | | | 17 | | | 6 | 44 | 8 | | 3 | 7 | | Black1
| 80~ | | | | | | | | | | | | | | | | | | | | | | | | |
| 120~ | | | | | | | | | | | | | | | | | | | | | | | | |
| 160~ | 3 | 6 | | | | | | | | 3 | 3 | | | | 9 | | | 1 | 3 | | 1 | 2 | | | Gray2
| 200~ | 4 | 2 | | | | | 4 | | | | | | | | 6 | | | | 7 | | | | 11 | | White
| 240~ | | | | | | | | | | | | | | | | | | | | | | | | |

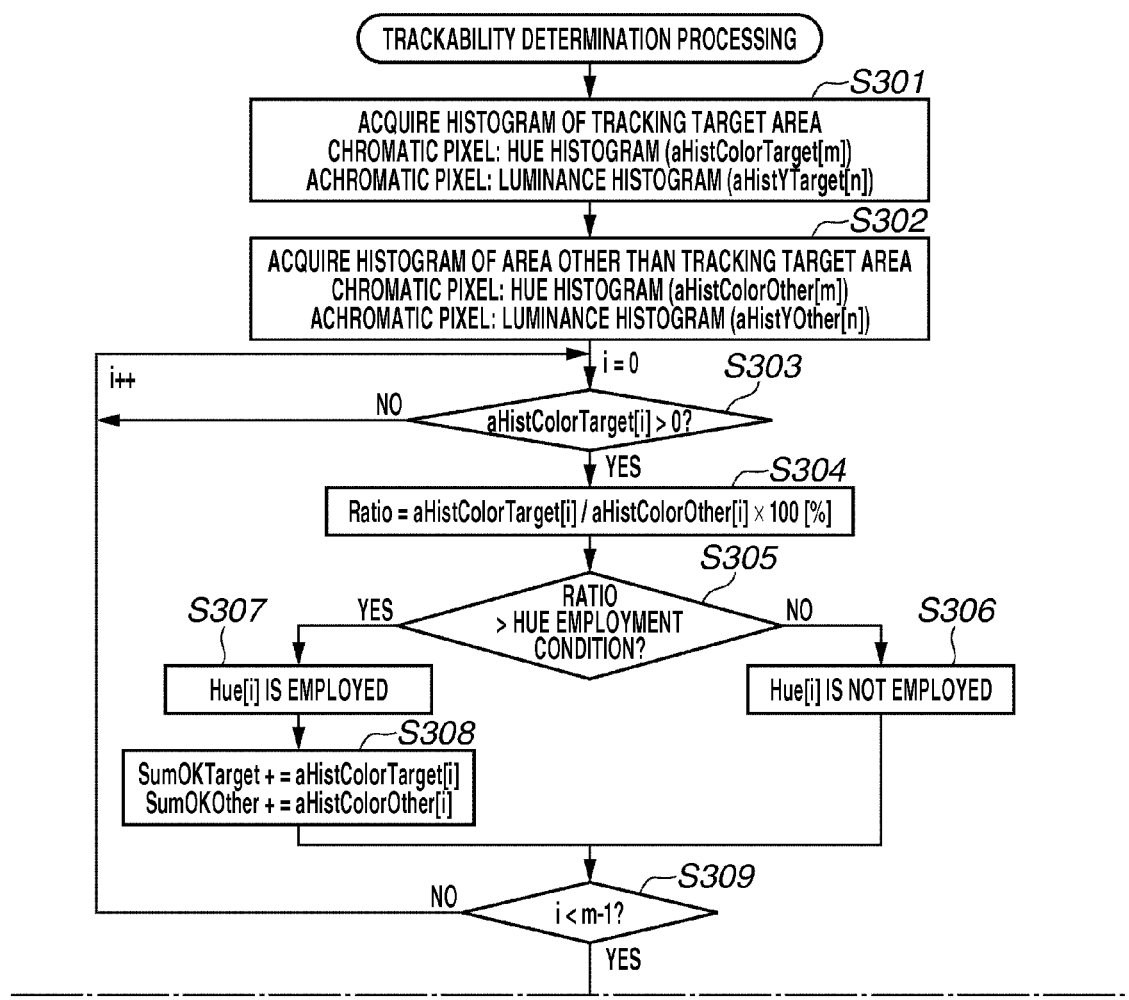

HISTOGRAM-BASED OBJECT TRACKING APPARATUS AND METHOD

This application claims priority from Japanese Patent Application No. 2009-183629 filed Aug. 6, 2009, which is hereby incorporated by reference herein in its entirety.

BACKGROUND OF THE INVENTION

1. Field of the Invention

The present invention relates to an image processing apparatus and an image processing method. More specifically, the present invention relates to a method for tracking an object by using an image.

2. Description of the Related Art

A conventional method for tracking an arbitrary object uses a pattern matching method, which searches for an area having a high degree of matching with a previously stored template image. In addition, a conventional object tracking method uses a relative difference method, in which template images are serially updated and the location of an object is identified based on a difference between a current frame and a previous frame. Furthermore, a conventional object tracking method uses a histogram matching method, in which the location of an object is identified based on the result of a search for an area having a high degree of matching with a color or luminance histogram of the object.

If the above-described pattern matching method is used, a still object can be searched with a high degree of accuracy. However, the performance of tracking a moving object when the pattern matching method is used is not good. More specifically, if the distance between an object and a tracking apparatus varies, if an object rotates, or if the orientation of the tracking apparatus itself varies, the pattern matching method cannot track the object with a high degree of accuracy.

If the above-described relative difference method is used, if another object moves in front of a tracking target object or if the tracking target object has gone out of the scope of imaging, then the tracking target object may not be tracked appropriately.

If the histogram matching method is used, a moving tracking target object can be tracked but the performance of identifying the tracking target object is low if the identification is executed based on a color or luminance histogram only. Furthermore, the tracking performance of the histogram matching method is not sufficiently good if similar colors or areas having approximately the same level of luminance are largely distributed in the background of an object.

In order to improve the tracking performance when various tracking methods are used, Japanese Patent Application Laid-Open No. 2004-348273 discusses a histogram matching method for generating a histogram of a reference area and a histogram of an extended reference area, which is provided separately from the reference area, and executing tracking based on the histograms. More specifically, the method discussed in Japanese Patent Application Laid-Open No. 2004-348273 generates a histogram of a reference area, such as an area around the face of a person, and another histogram of an extended reference area, such as an area around the neck of the person.

However, if the method discussed in Japanese Patent Application Laid-Open No. 2004-348273 is used, it is necessary to set two areas that are independent of each other, i.e., a reference area and an extended reference area, as areas whose histograms are to be generated. Accordingly, if the object is hidden behind something in the extended reference area, the tracking performance may be degraded.

SUMMARY OF THE INVENTION

According to an aspect of the present invention, an apparatus includes a storage unit configured to store an attribute of each pixel existing inside a tracking target area set on an image and an attribute of a pixel existing adjacent to the pixel, an allocation unit configured to allocate an evaluation value to a pixel to be evaluated according to a result of comparison between an attribute of the pixel to be evaluated and an attribute of a pixel existing inside the tracking target area and a result of comparison between an attribute of a pixel existing adjacent to the pixel to be evaluated and an attribute of a pixel existing adjacent to the pixel existing inside the tracking target area, and a changing unit configured to change the tracking target area based on the allocated evaluation value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6A illustrates an example of a hue histogram. FIG. 6B illustrates an example of an average hue histogram.

FIG. 7A illustrates an example of a luminance histogram. FIG. 7B illustrates an example of an average luminance histogram.

FIG. 8A illustrates an example of pixels existing adjacent to two pink pixels. FIG. 8B illustrates an example of pixels existing adjacent to three yellow pixels. FIG. 8C illustrates an example of pixels existing adjacent to two green pixels. FIG. 8D illustrates an example of pixels existing adjacent to one blue2 pixels.

FIG. 9A illustrates an example of pixels existing adjacent to one black0 pixel. FIG. 9B illustrates an example of pixels existing adjacent to twelve black1 pixels. FIG. 9C illustrates an example of pixels existing adjacent to two gray2 pixels. FIG. 9D illustrates an example of pixels existing adjacent to three white pixels.

FIG. 10 illustrates an example of an adjacent histogram, which corresponds to a hue histogram of a main histogram.

FIG. 11 illustrates an example of an adjacent histogram, which corresponds to a luminance histogram of a main histogram.

DESCRIPTION OF THE EMBODIMENTS

Various exemplary embodiments, features, and aspects of the invention will be described in detail below with reference to the drawings.

Figure 1:
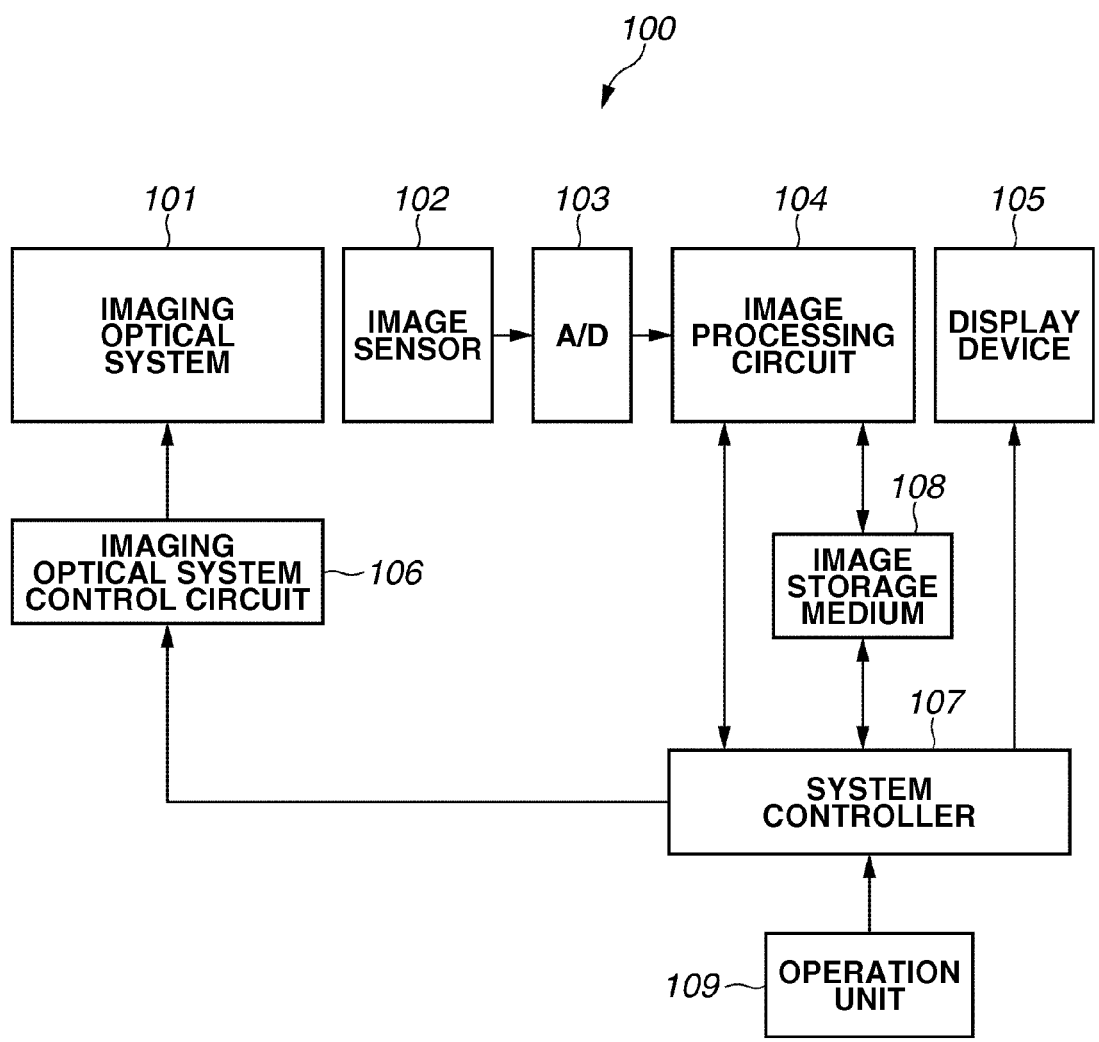
FIG. 1 illustrates an example of a basic configuration of an imaging apparatus according to a first embodiment of the present invention.

FIG. 1 illustrates an example of a basic configuration of an imaging apparatus 100 according to a first embodiment of the present invention. The imaging apparatus 100 is capable of capturing both a still image and a moving image. Referring to FIG. 1, light reflected from an object goes through an imaging optical system 101, which includes a focus lens, a variable magnification lens, and a fixed lens. An image of the reflection light from the object is formed by an image sensor 102.

The image sensor 102 is a photoelectric conversion element for converting a signal of the light from an image formed on a light-receiving plane into an electric signal for each light for each photodetection pixel existing at a corresponding location. The light whose image has been formed on the image sensor 102 is converted by the image sensor 102 into an electric signal. The electric signal is input to an analog-to-digital (A/D) converter 103. The A/D converter 103 converts the input electric signal into a digital signal. Then, the digital signal is input to an image processing circuit 104. The image processing circuit 104 executes image processing on the input digital signal (image data).

A display device 105 is a display unit, which is provided on a back surface of the imaging apparatus 100. The display device 105 functions as an electronic viewfinder. In addition, the display device 105 displays information about a setting status on the imaging apparatus 100. Furthermore, the display device 105 displays a thumbnail image generated by the imaging apparatus 100.

An imaging optical system control circuit 106 generates lens information. The lens information includes an object distance, a focal length, which is acquired based on information about the location of a variable power lens group, and an F number, which is acquired based on the aperture diameter of a diaphragm.

A system controller 107 includes a microcomputer. The system controller 107 controls an operation in an operation unit 109 of the entire imaging apparatus 100 by executing a control program. An image recording medium 108 records image data. In the present embodiment, an example of a method for tracking an image of an arbitrary object, which is executed on the imaging apparatus 100 having the configuration described above, will be described in detail.

Figure 2A:
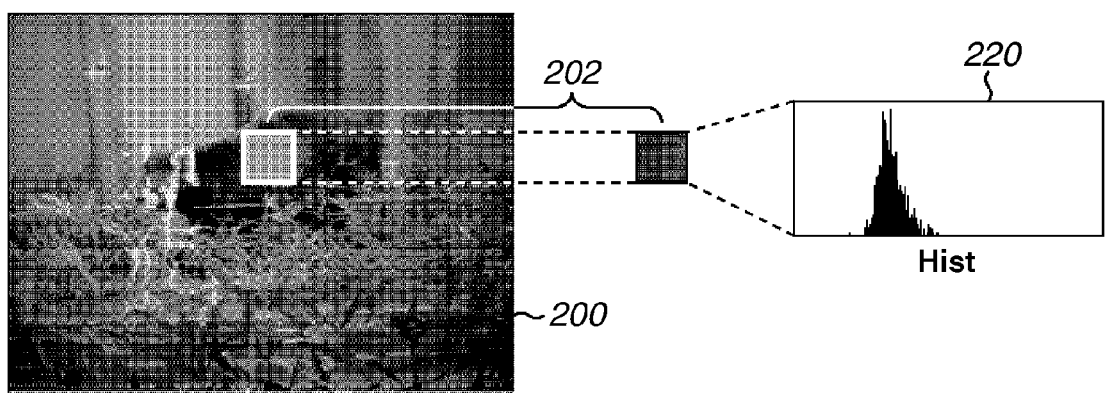
FIG. 2A illustrates a state in which an animal, whose image is located approximately in the center of the imaging scope, is set as a tracking target object.
Figure 2B:
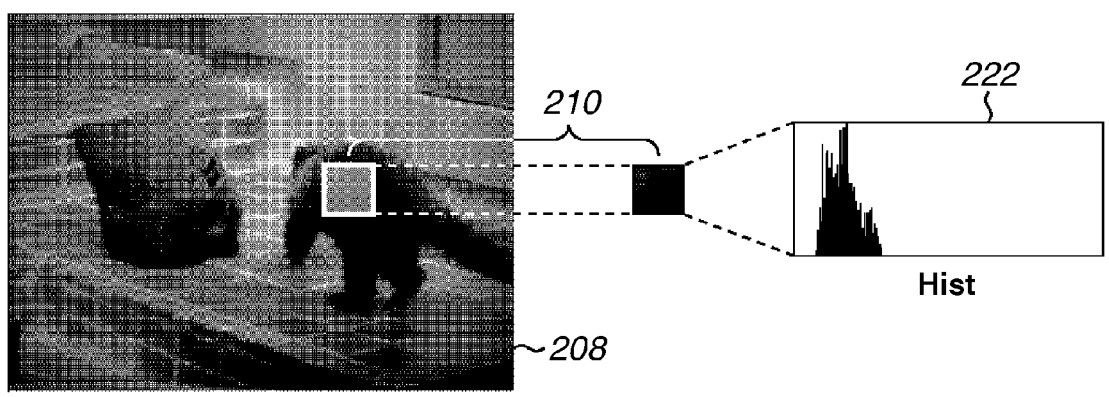
FIG. 2B illustrates a state in which the animal set as the tracking target object has moved.

FIGS. 2A and 2B illustrate an example of a scene which includes an image that a conventional object tracking method cannot appropriately track.

Referring to FIG. 2A, an animal existing around the center of a screen 200 is set as a tracking target object. For a method for designating a tracking target object, it is useful if an area satisfying a predetermined color condition or luminance condition is automatically identified and set as a tracking target object. In addition, it is also useful if a user touches the display device 105 on a touch panel included therein at an arbitrary location and an image corresponding to the location touched by the user is set as a tracking target object.

In the example illustrated in each of FIGS. 2A and 2B, it is supposed that an area 202, which is an area corresponding to the belly and around of an animal, is set as a tracking target area, that the animal has moved to another location after that, and that thus the orientation of the animal has been changed.

If the above-described change in the tracking target object has been made, the pattern matching method, in which an image included in the tracking target area 202 illustrated in FIG. 2A and an image included in an area 210 corresponding to the belly area of the animal after it has moved to a different position are compared to each other, the system cannot track the animal.

As illustrated in FIGS. 2A and 2B, the histogram matching method, which compares a histogram 220 of the tracking target area 202 with another histogram 222 of the image of the area 210 corresponding to the belly area of the animal after it has moved to the different place, cannot appropriately track the animal because the histograms do not match each other.

Now, an example of a method according to the present embodiment for tracking an arbitrary object will be described in detail below with reference to the following flow charts.

In the present embodiment, the system controller 107 executes processing according to the following flow chart. However, it is also useful if a part of or the whole of the processing is executed by a component other than the system controller 107 (e.g., the image processing circuit 104).

Figure 3:
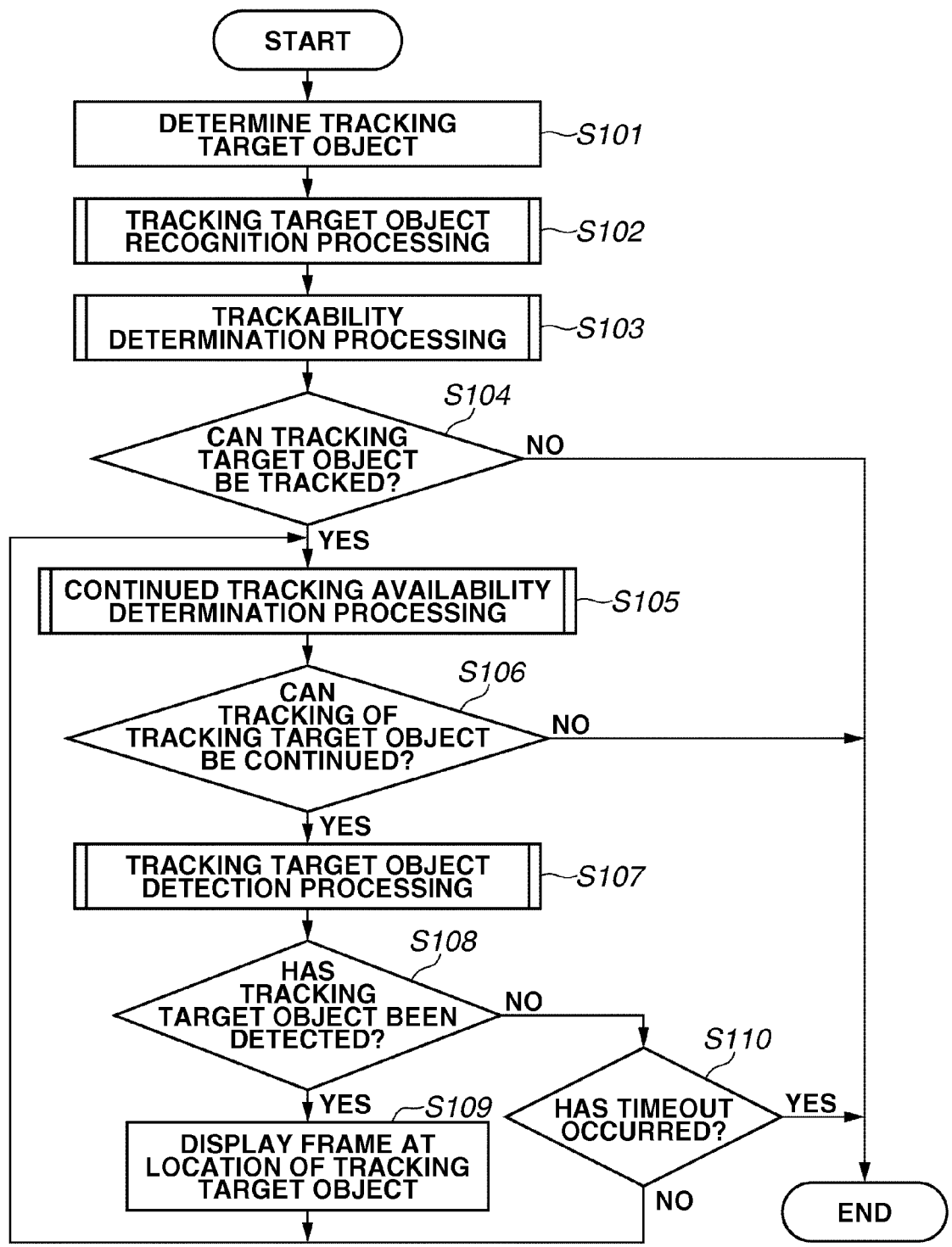
FIG. 3 is a flow chart illustrating an example of processing for tracking a tracking target object, which is executed by the imaging apparatus.

FIG. 3 is a main flow chart illustrating an example of processing executed by the imaging apparatus 100 for tracking a tracking target object. Referring to FIG. 3, in step S101, the system controller 107 determines a location and a size of the tracking target object.

As described above, a tracking target object can be automatically identified. Alternatively, a user can designate an arbitrary area by viewing through an electronic viewfinder to determine a tracking target object. After the location and the size of the tracking target object have been determined, then the processing advances to step S102. In step S102, the system controller 107 executes processing for recognizing the tracking target object based on color information and luminance information about the tracking target area.

Figure 4:
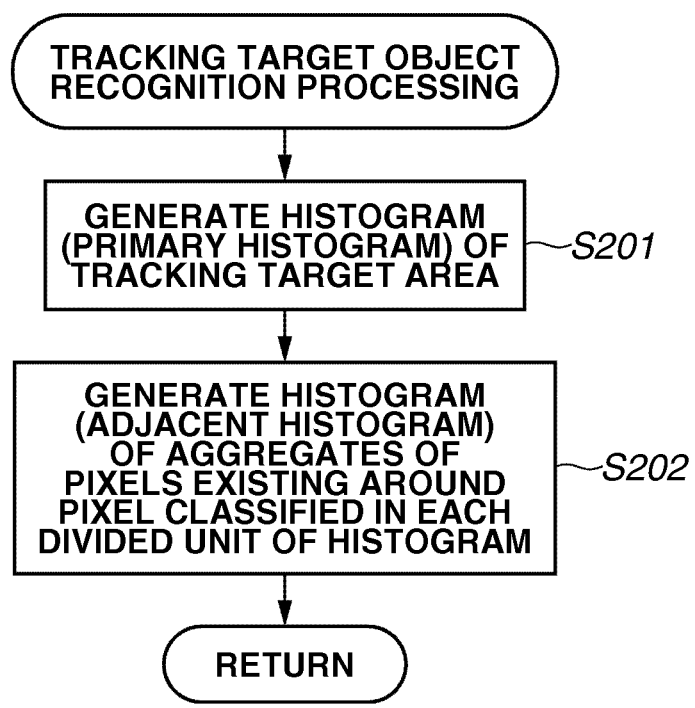
FIG. 4 is a flow chart illustrating an example of processing for recognizing a tracking target object.

FIG. 4 is a flow chart illustrating an example of processing for recognizing a tracking target object in step S102 illustrated in FIG. 3. Referring to FIG. 4, in step S201, the system controller 107 generates a histogram of a tracking target area (main histogram).

Figure 5:
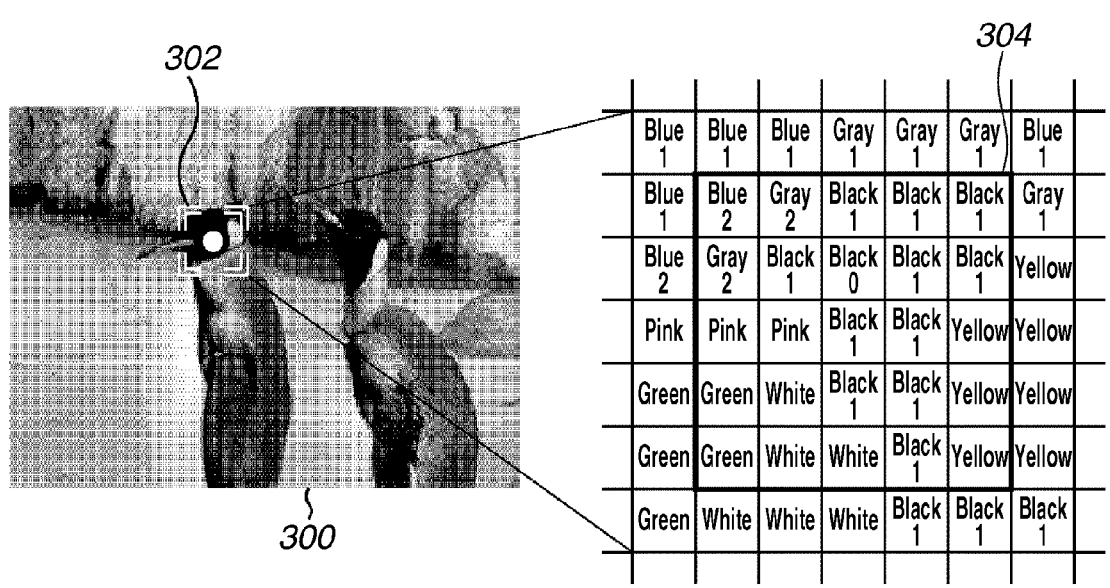
FIG. 5 illustrates an example of an image and pixels included in a tracking target area of the image.

FIG. 5 illustrates an example of an image and pixels included in a tracking target area of the image. Referring to FIG. 5, an image 300 includes a scene of a penguin captured by a camera. The user can designate a portion of the image 300 by touching the touch panel on a tracking target area 302 to determine the tracking target area.

The tracking target area 302 corresponds to an area 304, which is illustrated in FIG. 5 in its right portion, surrounded by a thin-line rectangle. The system controller 107 generates histograms of pixels inside and outside the area 304.

The histograms include a hue histogram and a luminance histogram. The distribution is taken on each of the hue histogram and the luminance histogram according to whether each pixel is a chromatic color pixel or an achromatic color pixel. Determination as to whether each pixel is a chromatic color pixel or an achromatic color pixel is executed based on a result of comparison of saturation of each pixel with its threshold value. In the present embodiment, the system controller 107 generates a histogram of each area included in the tracking target area 302 and each area existing outside the tracking target area 302.

FIG. 6A illustrates an example of a hue histogram (i.e., a histogram of chromatic color pixels). FIG. 6B illustrates an example of an average hue histogram. The average hue histogram indicates an average luminance, an average saturation, and an average hue of a pixel classified by the hue histogram. FIG. 7A illustrates an example of a luminance histogram (i.e., a histogram of achromatic color pixels). FIG. 7B illustrates an example of an average luminance histogram. The average luminance histogram indicates an average luminance of a pixel classified by the luminance histogram. A chromatic color pixel is classified in (registered in) a hue histogram 400.

The system controller 107 counts the number of pixels existing inside the tracking target area ("In" in FIG. 6A) and those existing outside the tracking target area ("Out" in FIG. 6A) for each hue ("Hue" in FIG. 6A) existing inside the tracking target area 302.

In the example illustrated in FIGS. 6A and 6B, the system controller 107 generates a hue histogram 400 in the unit of division (the unit of classification) of an angle of 40° each. However, it is also useful if the unit of division is changed according to a desired accuracy of tracking. An achromatic color pixel is classified in (registered in) a luminance histogram 440.

The system controller 107 counts the number of pixels existing inside the tracking target area ("In") and the number of pixels existing outside the tracking target area ("Out") for each luminance Y existing inside the tracking target area 302. In the examples illustrated in FIGS. 7A and 7B, the system controller 107 generates a luminance histogram 440 in the division unit of 40 LSB. However, the division unit can be changed according to a desired accuracy of tracking.

After generating the hue histogram 400 and the luminance histogram 440, the system controller 107 calculates a ratio of existence of each hue inside and outside the tracking target area. The ratio of existence of each hue inside and outside the tracking target area can be calculated by the following expression:

Ratio of Existence of Each Hue inside and outside Tracking Target Area[%]=Number of Pixels Existing inside Tracking Target Area/Number of Pixels Existing outside Tracking Target Area.

For example, in the example illustrated in FIG. 6A, fifteen pixels having the pink hue, i.e., two pixels having the pink hue inside the tracking target area 302 and thirteen pixels having the pink hue outside the tracking target area 302, exist. Accordingly, the existence ratio thereof is 15% (=(2/13)× 100).

However, if one or more pixels exist within the tracking target area and if the number of pixels existing outside the tracking target area is zero, then the existence ratio is 100%. The existence ratio is calculated in the above-described manner. However, the present invention is not limited to this. More specifically, it is also useful if the existence ratio is calculated by the following expression:

Ratio of Existence[%]=[Number of Pixels Existing inside Tracking Target Area/(Number of Pixels Existing inside Tracking Target Area+Number of Pixels Existing outside Tracking Target Area)]× 100.

In addition to calculating the distribution of the hue, the system controller 107 calculates an average luminance AveY, an average saturation AveChroma, and an average hue AveHue of a pixel classified in a unit of division, for the unit of division in the histogram of pixels existing inside the tracking target area 302.

More specifically, in the hue histogram 400 illustrated in FIG. 6A, three pixels having the yellow hue exist inside the tracking target area 302. Accordingly, in an average hue histogram 420 illustrated in FIG. 6B, the three pixels have the average luminance AveY of 153 LSB, the average saturation AveChroma of 55 LSB, and the average hue AveHue of 113°.

Similarly, in a histogram 440 illustrated in FIG. 7A, three pixels having achromatic color hue (white hue) exist inside the tracking target area 302. Accordingly, in an average luminance histogram 480 illustrated in FIG. 7B, the three pixels have the average luminance of 210 LSB.

As described above, as information about the chromatic color pixel existing inside the tracking target area 302, the hue histogram 400 and the average luminance AveY, the average saturation AveChroma, and the average hue AveHue classified in the hue histogram 400 (the average hue histogram 420) are acquired. In addition, as information about the achromatic color pixel existing inside the tracking target area 302, the luminance histogram 440 and the average luminance AveY classified in the luminance histogram 440 (the average luminance histogram 480) are acquired. In the following description, the hue histogram 400, the average hue histogram 420, the luminance histogram 440, and the average luminance histogram 480 are collectively referred to as a "main histogram" where necessary.

Returning to FIG. 4, in step S202, the system controller 107 generates histograms 500 and 520 of an aggregate of pixels existing adjacent to each pixel classified in the division unit in each of the hue histogram 400 and the luminance histogram 440 of the main histogram. In the following description, the histograms 500 and 520 are collectively referred to as an "adjacent histogram" where necessary.

FIGS. 8A through 8D and FIGS. 9A through 9D schematically illustrate a first and a second example of a pixel whose adjacent histogram is to be generated. As illustrated in FIGS. 6A and 6B and FIGS. 7A and 7B, it is supposed that eight distributions including four distributions of pink, yellow, green, and blue2, i.e., information about the chromatic color pixel inside the tracking target area 302, and four other distributions of black0, black1, gray2, and white, i.e., information about the achromatic color pixel inside the tracking target area 302, have been acquired. FIGS. 8A through 8D and FIGS. 9A through 9D illustrate an example of adjacent pixels of each pixel having the eight distributions.

Referring to FIG. 8A, pixels existing adjacent to two pink pixels 550 and 552 are indicated by circles surrounding the same. A total of eight pixels including one blue2 pixel, one gray2 pixel, one black1 pixel, two pink pixels, one white pixel, and two green pixels are distributed around the pink pixel 550. In addition, a total of eight pixels including one gray2 pixel, one black1 pixel, one black0 pixel, one white pixel, one green pixel, and two pink pixels are distributed around the pink pixel 552.

The system controller 107 generates the histograms based on the sixteen pixels surrounding the pink pixels 550 and 552, which constitute the aggregate of pixels existing adjacent to the pink pixels.

Similarly, a total of twenty-four pixels exist adjacent to three yellow pixels 554, 556, and 558 in the example illustrated in FIG. 8B. A total of sixteen pixels exist adjacent to two green pixels 560 and 562 in the example illustrated in FIG. 8C. In the example illustrated in FIG. 8D, a total of eight pixels exist adjacent to one blue2 pixel 564.

FIGS. 9A through 9D illustrate an example of pixels existing adjacent to an achromatic color pixel. More specifically, adjacent pixels, i.e., a black0 pixel, a black1 pixel, a gray2 pixel, and a white pixel are illustrated in FIGS. 9A through 9D.

In the present embodiment, for the main histogram for the tracking target area 304 illustrated in FIG. 5, the system controller 107 generates a histogram of pixels existing inside the tracking target area 304. On the other hand, for the adjacent pixels, the system controller 107 executes recognition thereof existing in an area wider than the tracking target area 304.

With the above-described configuration, the system controller 107 according to the present embodiment can acquire information about adjacent pixels including information about the relationship between the tracking target object and the background thereof. Accordingly, the present embodiment can acquire an appropriate result of tracking. However, it is also useful if the same area is referred to for both.

The system controller 107 associates the histogram of the aggregate of the pixels including pixels existing adjacent to each pixel classified in each division unit in the main histogram illustrated in FIGS. 8A through 8D and FIGS. 9A through 9A (the adjacent histogram) with the main histogram. Furthermore, the system controller 107 stores the adjacent histogram and the main histogram in a format illustrated in FIGS. 10 and 11.

FIG. 10 illustrates an example of the adjacent histogram, which corresponds to a hue histogram of the main histogram. FIG. 11 illustrates an example of the adjacent histogram, which corresponds to a luminance histogram of the main histogram.

In the adjacent histogram, as information about the distribution of the adjacent pixel, the system controller 107 can extract a luminance ("Y"), a saturation ("Chroma"), and a hue ("Hue") from the chromatic color ("Color") pixel and can acquire the distribution of each of them. Furthermore, the system controller 107 can acquire the distribution of the luminance Y based on an achromatic color ("Colorless") pixel.

In the present embodiment, by executing the processing in steps S201 and S202, an storage unit is implemented. More specifically, by executing the processing in step S201, an example of a main histogram storage unit is implemented while by executing the processing in step S202, an example of an adjacent histogram storage unit is implemented.

In the present embodiment, if a pixel to be evaluated is a chromatic color pixel, a first attribute of the pixel is the hue ("Hue"). On the other hand, if a pixel to be evaluated is an achromatic color pixel, the first attribute of the pixel is the luminance ("Y").

In the present embodiment, if the pixel existing adjacent to the pixel to be evaluated is a chromatic color pixel, then a second attribute of the adjacent pixel includes the hue ("Hue"), the saturation ("chroma"), and the luminance ("Y"). On the other hand, if the pixel existing adjacent to the pixel to be evaluated is an achromatic color pixel, then the second attribute of the adjacent pixel is the luminance ("Y").

After the tracking target object recognition processing including acquisition of the main histogram and the adjacent histogram illustrated in the flow chart of FIG. 4 ends, then in step S103 (FIG. 3), the system controller 107 executes processing for determining whether the tracking target object can be tracked.

Figure 12B:
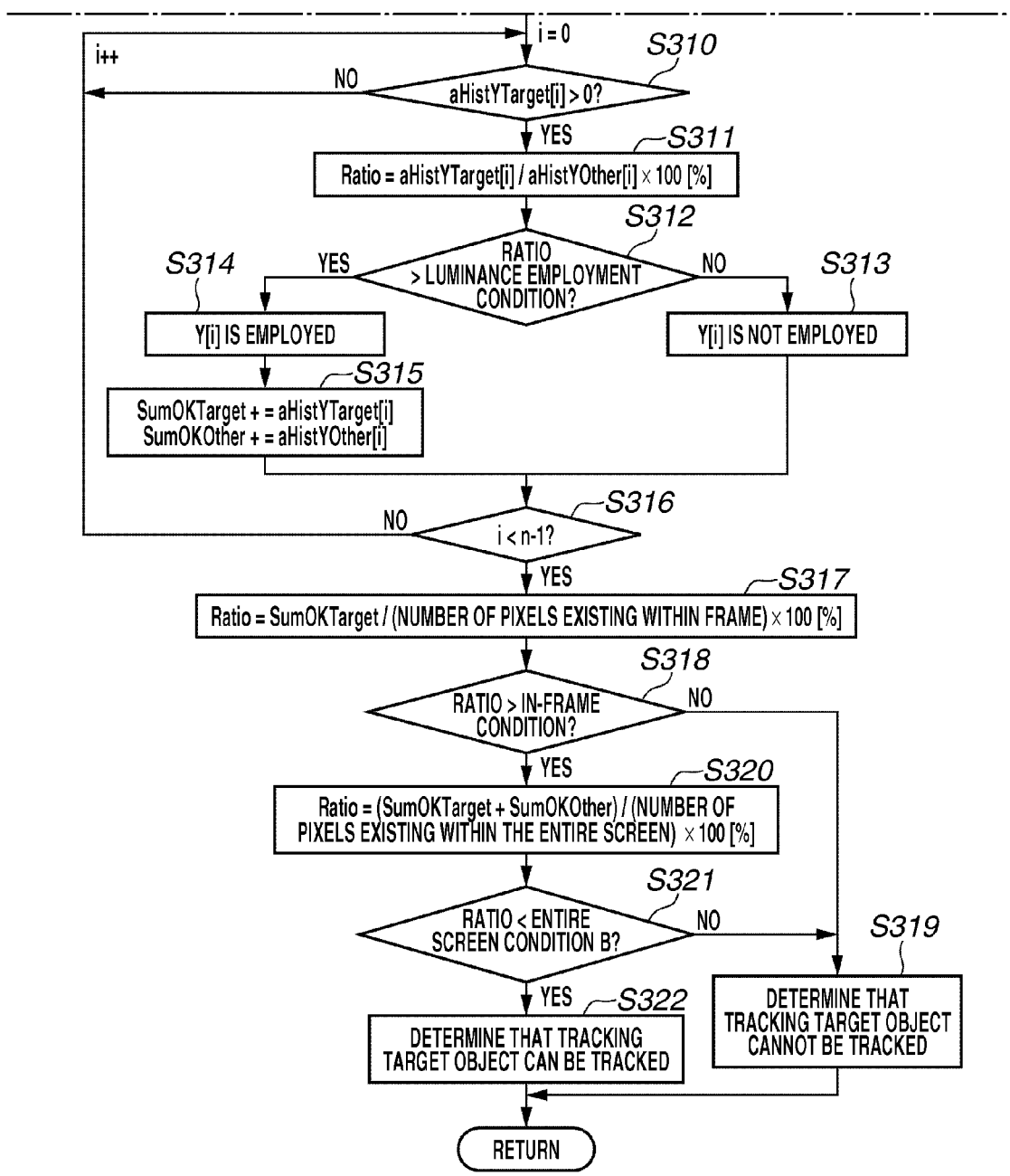
FIG. 12, composed of FIGS. 12A and 12B, is a flowchart illustrating an example of trackability determination processing in step S103 in the flow chart illustrated in FIG. 3.

FIG. 12, composed of FIGS. 12A and 12B, is a flow chart illustrating an example of trackability determination processing in step S103 in the flow chart illustrated in FIG. 3.

Referring to FIG. 12, in steps S301 and S302, the system controller 107 generates a main histogram including the hue histogram and the luminance histogram for the pixels existing inside or outside the tracking target area in the manner as described above with reference to FIG. 4, FIGS. 6A and 6B, and FIGS. 7A and 7B.

In the flow chart illustrated in FIG. 12, "aHistColorTarget [m]" denotes the number of pixels existing inside the tracking target area ("In") for each hue ("Hue") in the hue histogram 400 illustrated in FIG. 6A. In addition, "aHistYTarget[n]" denotes the number of pixels existing inside the tracking target area ("In") for each luminance Y in the luminance histogram 440 illustrated in FIG. 7A. Furthermore, "aHistColorTarget[m]" denotes the number of pixels existing outside the tracking target area ("Out") for each hue ("Hue") in the hue histogram 400 illustrated in FIG. 6A. Moreover, "aHistYOther[n]" denotes the number of pixels existing outside the tracking target area ("Out") for each luminance Y in the luminance histogram 440 illustrated in FIG. 7A. In addition, the system controller 107 generates the average hue histogram illustrated in FIG. 6B and the average luminance histogram illustrated in FIG. 7B based on the values described above.

In step S303, the system controller 107 determines whether pixels are distributed inside the tracking target area in the division unit included in the hue histogram. In the present embodiment, "aHistColorTarget[i]" used in step S303 denotes a value of the number of pixels existing inside the tracking target area ("In") corresponding to a specific hue ("Hue") (i) in the hue histogram 400. More specifically, in step S303, the system controller 107 determines whether aHistColorTarget[i]>0.

If one or more pixels having the hue (i) exist inside the tracking target area (YES in step S303), then the processing advances to step S304. In step S304, the system controller 107 calculates the existence ratio for the inside or the outside of the tracking target area for the hue ("Hue") (i).

The existence ratio of the hue inside or outside the tracking target area is calculated as described above with reference to FIGS. 6A and 7A. More specifically, the system controller 107 calculates the existence ratio by multiplying a result of dividing the number of pixels existing inside the tracking target area ("In") for the hue ("Hue") (i) (aHistColorTarget [i]) by the number of pixels existing outside the tracking target area ("Out") (aHistColorOther[i]) by 100. However, if aHistColorTarget[i]≧1 and if aHistColorOther=0, then the existence ratio is 100%.

In step S305, the system controller 107 determines whether the existence ratio is higher than a ratio, which is a predetermined hue employment condition. If it is determined that the existence ratio is higher than the ratio, which is the predetermined hue employment condition (NO in step S305), then it is determined that the same color as the color of the tracking target object largely exists in the background and that if the tracking using the color is executed, the accuracy of the tracking may be low. Accordingly, in step S306, the system controller 107 determines not to employ the hue (i) to be processed in order to achieve a high tracking accuracy.

On the other hand, if it is determined that the existence ratio is higher than the ratio that is the predetermined hue employment condition, then the processing advances to step S307. In step S307, the system controller 107 determines that the hue (i) to be processed is to be employed.

In step S308, the system controller 107 stores "SumOKTarget" and "SumOKOther" of the processing target hue (i). In the present embodiment, "SumOKTarget" denotes the total number of the number of pixels existing inside the tracking target area ("aHistColorTarget[i]"). Furthermore, in the present embodiment, "SumOKOther" denotes the total number of the number of pixels existing outside the tracking target area ("aHistColorOther[i]"). In step S309, the system controller 107 repeats the processing in steps S303 through S308 for all the hues (i).

As described above, in the present embodiment, the system controller 107 determines whether to employ the hue (i) in all the division units in the hue histogram. In addition, the system controller 107 stores the total sum of the number of pixels employed.

Furthermore, the system controller 107 determines whether the existence ratio of pixels inside and outside the tracking target area is higher than the ratio that is the predetermined luminance employment condition, with respect to the luminance histogram. In steps S310 through S316, the system controller 107 determines whether to employ the luminance Y (i) in the division unit in the luminance histogram.

"SumOKTarget", which denotes the total number of pixels existing inside the tracking target area, and "SumOKOther", which denotes the total number of pixels existing outside the tracking target area, are values calculated by adding the number of pixels having the employed luminance Y (i) to the total sum of the number of pixels having the employed hue (i), respectively.

Accordingly, the resulting "SumOKTarget", which denotes the total number of pixels existing inside the tracking target area, is the total sum of the number of pixels having the employed hue (i). Furthermore, the resulting "SumOKOther", which denotes the total number of pixels existing outside the tracking target area, is the total sum of the number of pixels having the employed luminance Y (i).

In the present embodiment, the "hue employment condition" and the "luminance employment condition" can be set independently from each other. In particular, it is less easy to use an achromatic color, than a chromatic color, as a characteristic of a tracking target object. Accordingly, for the achromatic color, an employment condition stricter than the hue employment condition can be set for the luminance employment condition.

In addition, although not illustrated in the drawing, it is also useful if the employment condition is changed for only a specific color or luminance instead of setting the employment conditions of chromatic color or achromatic color. In addition, it is also useful if either the processing in steps S303 through S309 or the processing in step S310 through S316 is not to be executed.

After executing the above-described employment determination processing for in the division unit in the hue histogram and the luminance histogram (the main histogram), the processing advances to step S317. In step S317, the system controller 107 determines the ratio of the employed chromatic color pixel or achromatic color pixel existing inside the tracking target area.

More specifically, the system controller 107 calculates the ratio by multiplying a value calculated by dividing "SumOKTarget", which is the employed total number of pixels existing inside the tracking target area, by the number of pixels existing within the frame by 100.

In step S318, the system controller 107 determines whether the ratio is higher than a predetermined within-frame condition. If it is determined that the ratio is not higher than the predetermined within-frame condition (NO in step S318), then the processing advances to step S319. In step S319, the system controller 107 determines that no appropriate characteristic of the tracking target object has been acquired and that the tracking target object cannot be tracked.

On the other hand, if it is determined that the ratio is higher than the within-frame condition (YES in step S318), then the system controller 107 determines that an appropriate characteristic of the tracking target object has been acquired. Then the processing advances to step S320. In step S320, the system controller 107 calculates the ratio of existence of the employed chromatic color pixel or achromatic color pixel within the screen.

More specifically, the system controller 107 calculates the ratio in the following manner. At first, the system controller 107 adds SumOKTarget, which is the total number of pixels existing inside the tracking target area to SumOKOther, which is the total number of pixels existing outside the tracking target area. Then, the system controller 107 divides the result of the addition by the number of pixels existing within the screen. Then, the system controller 107 multiplies the result of the division by 100.

In step S321, the system controller 107 determines whether the ratio calculated in the above-described manner is lower than a predetermined entire-screen condition B. If it is determined that the ratio is not lower than the predetermined entire-screen condition B (NO in step S321), then the processing advances to step S319. In step S319, the system controller 107 determines that that tracking target object cannot be tracked because the tracking performance may degrade due to a large number of chromatic color pixels or achromatic color pixels to be tracked existing in the background area, which is outside the tracking target area.

On the other hand, if it is determined that the ratio is lower than the predetermined entire-screen condition B (YES in step S321), then the processing advances to step S322. In step S322, the system controller 107 determines that the tracking target object can be tracked.

As described above, the system controller 107 determines whether the tracking target object can be tracked in a plurality of stages including single-attribute evaluation processing in relation to each color and luminance, the evaluation processing as to the pixels existing inside the tracking target area, and the evaluation processing as to the pixels included in the entire screen. Accordingly, the system controller 107 according to the present embodiment can securely and appropriately determine whether a tracking target object can be tracked.

However, it is not always necessary to execute the entire-screen evaluation in steps S320 and S321.

Returning to FIG. 3, in step S104, the system controller 107 determines whether the tracking target area can be tracked based on the result of the trackability determination processing described above. If it is determined that the tracking target area cannot be tracked (NO in step S104), then the processing according to the flow chart of FIG. 3 ends. On the other hand, if it is determined that the tracking target area can be tracked (YES in step S104), then tracking loop processing starts.

Figure 13:
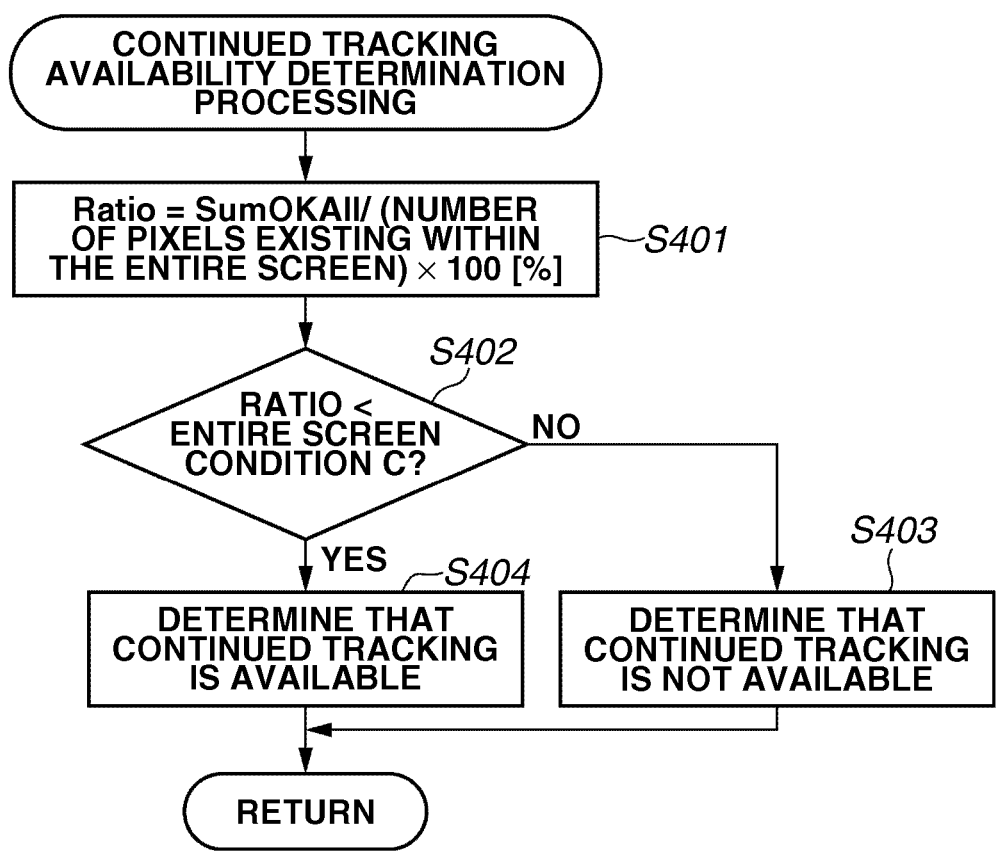
FIG. 13 is a flow chart illustrating an example of continued tracking availability determination processing in step S105 in the flow chart illustrated in FIG. 3.

In the tracking loop processing, in step S105, the system controller 107 determines whether continued tracking is available. FIG. 13 is a flow chart illustrating an example of continued tracking availability determination processing in step S105 in the flow chart illustrated in FIG. 3.

Referring to FIG. 13, in step S401, the system controller 107 calculates a ratio of chromatic color pixels and achromatic color pixels employed in the histograms illustrated in FIGS. 6A and 7A that exist within the screen. More specifically, the system controller 107 calculates the ratio by multiplying a value calculated by dividing "SumOKALL", which is the total number of chromatic color pixels and achromatic color pixels employed in the histograms illustrated in FIGS. 6A and 7A, by the number of pixels included in the entire screen, by 100. In the present embodiment, the total number of pixels "SumOKALL" is a value calculated by adding "SumOKTarget", which is the total number of pixels existing inside the tracking target area, to "SumOKOther", which is the total number of pixels existing outside the tracking target area.

In step S402, the system controller 107 determines whether the ratio is lower than a predetermined entire screen condition C. If it is determined that the ratio is not lower than the predetermined entire screen condition C (NO in step S402), then the processing advances to step S403. In step S403, the system controller 107 determines that the tracking target object cannot be tracked because the tracking performance may degrade due to a large number of chromatic color pixels or achromatic color pixels to be tracked existing in the background area, which is outside the tracking target area.

On the other hand, if it is determined that the ratio is lower than the predetermined entire-screen condition C (YES in step S402), then the processing advances to step S404. In step S404, the system controller 107 determines that the tracking target object can be tracked. In the present embodiment, the "entire screen condition C" can be set as a condition different from the "entire screen condition B", which is a final determination condition for determining whether the tracking target object can be tracked, which is processing in step S321 described above with reference to FIG. 12.

By using the entire screen condition C, which is stricter than the entire screen condition B, the system controller 107 according to the present embodiment can determine whether to immediately suspend the tracking when the status of the background has changed after the start of the tracking and thus the number of pixels having the same hue or luminance as that of the tracking target object has increased.

In the example illustrated in FIG. 13, the condition is fixed at the entire screen condition C. However, it is also useful if the condition is gradually changed (narrowed down) in accordance with the time elapsed after the start of tracking.

In addition, it is also useful if the "within-frame condition" used in step S318 (FIG. 12), the "entire screen condition B" used in step S321 (FIG. 12), and the entire screen condition C" used in step S402 (FIG. 13) are narrowed down for each case where the object is tracked based on the hue only, where the object is tracked based on the luminance only, and where the object is tracked based on both the hue and the luminance. In addition, it is also useful if the condition for a specific color only and the condition for the specific luminance only are further changed.

Returning to FIG. 3, in step S106, the system controller 107 determines whether the tracking of the tracking target area can be continued based on the result of the continued tracking availability determination processing. If it is determined that the tracking of the tracking target area cannot be continued (NO in step S106), then the processing illustrated in the flow chart of FIG. 3 ends. On the other hand, if it is determined that the tracking of the tracking target area can be continued (YES in step S106), then the processing advances to step S107. In step S107, the system controller 107 executes tracking target object detection processing.

Figure 14:
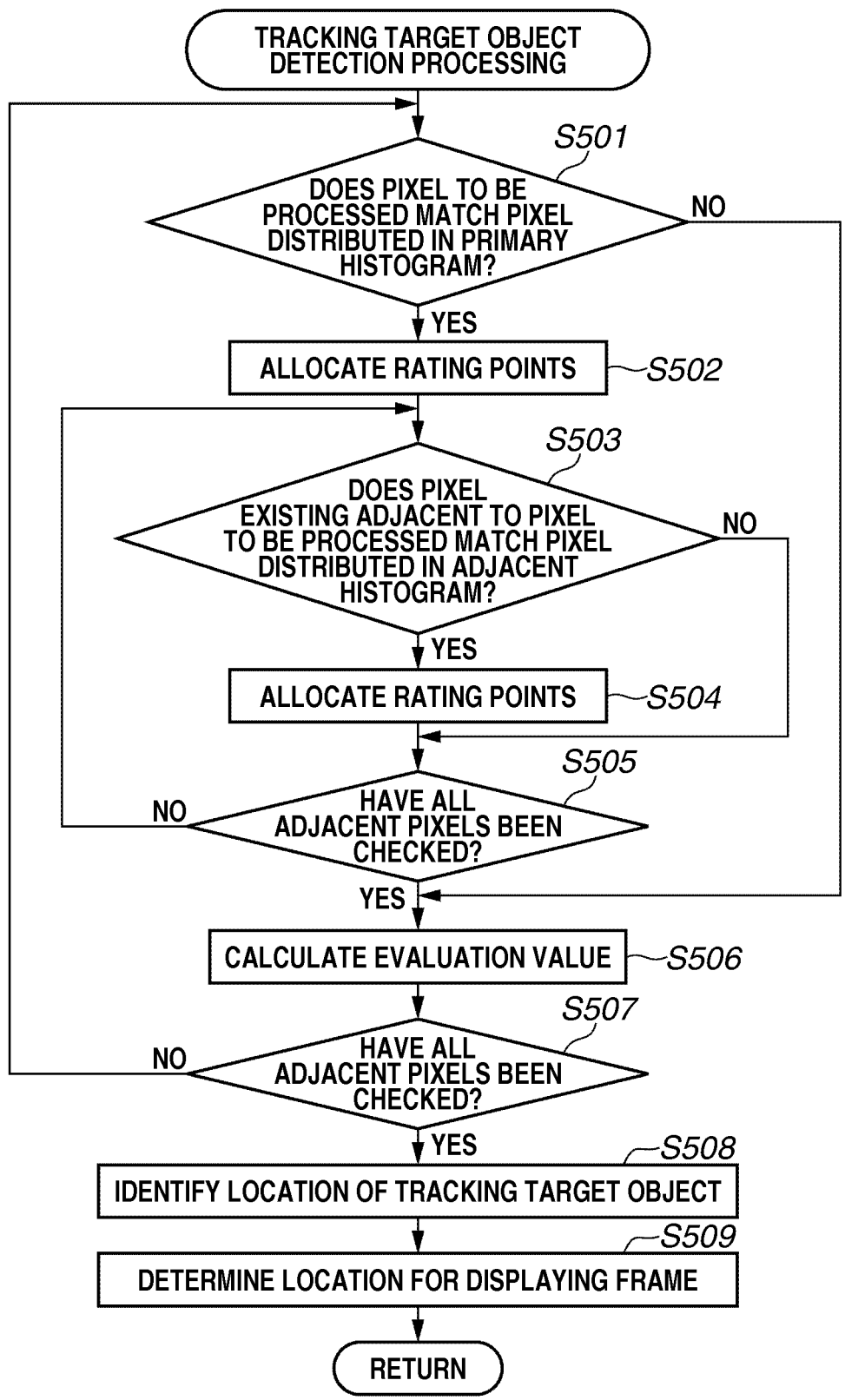
FIG. 14 is a flow chart illustrating an example of tracking target object detection processing in step S107 in the flow chart illustrated in FIG. 3.

FIG. 14 is a flow chart illustrating an example of tracking target object detection processing in step S107 in the flow chart illustrated in FIG. 3. The tracking target object detection processing can be executed either on the entire screen or only on an arbitrary area within the screen. However, in the present embodiment, it is supposed that the tracking target object detection processing is executed on the entire screen.

Figure 15:
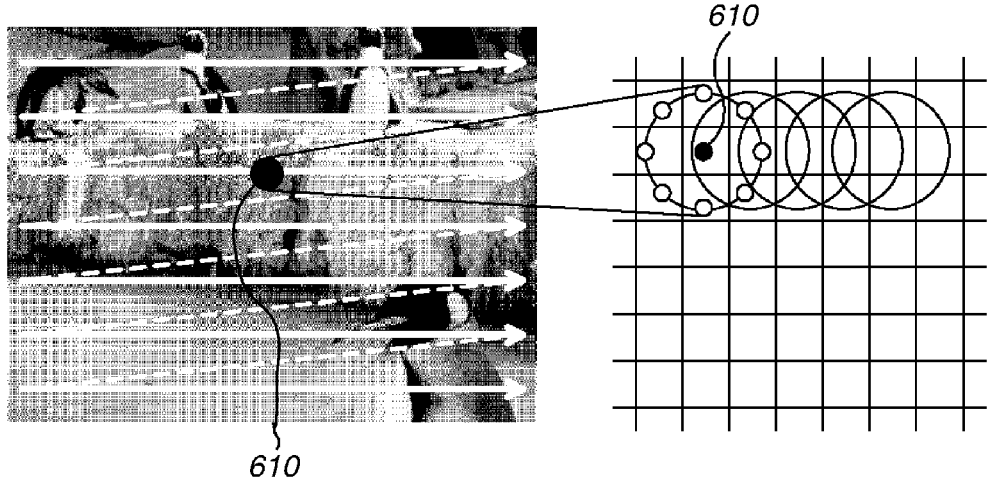
FIG. 15 schematically illustrates an example of a method for tracking a tracking target area.

FIG. 15 schematically illustrates an example of a method for tracking a tracking target area by executing tracking target object detection processing. Various starting points, directions, or orders can be set in tracking a tracking target object within the screen. However, in the present embodiment, it is supposed that the tracking of the tracking target object is executed horizontally starting with the upper-left portion of the screen as illustrated in FIG. 15. Then, the tracking is serially executed on lines below.

Referring to FIG. 14, in step S501, the system controller 107 determines whether the pixel to be processed (pixel to be evaluated) matches the pixel distributed in the histogram. More specifically, in step S501, the system controller 107 determines whether the pixel to be processed is a chromatic color pixel or an achromatic color pixel stored in the main histogram illustrated in the flow chart of FIGS. 6A and 7A as a pixel existing inside the tracking target area. In addition, in step S501, the system controller 107 determines whether the pixel to be processed has the average luminance, average saturation, or the average hue, which have been stored in the average histogram illustrated in FIGS. 6A and 7A, that fall within a predetermined range thereof.

If it is determined that the pixel to be processed does not match the pixel distributed in the main histogram (NO in step S501), then the processing advances to step S506. On the other hand, if it is determined that the pixel to be processed matches the pixel distributed in the main histogram (YES in step S501), then the processing advances to step S502. In step S502, the system controller 107 allocates rating points to the location of the pixel.

Figure 16A:
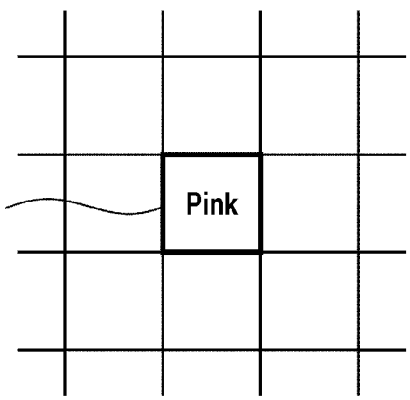
FIG. 16A illustrates an example of a state in which a pixel to be processed matches a chromatic color of the main histogram.

FIGS. 16A through 16D schematically illustrate an example of a method of allocating a rating point to a pixel to be searched for to detect the tracking target object. Referring to FIG. 16A, if a pixel to be processed (processing target pixel) 650 matches the chromatic color in the main histogram, then the system controller 107 allocates 1 rating point to the processing target pixel 650.

Figure 16B:
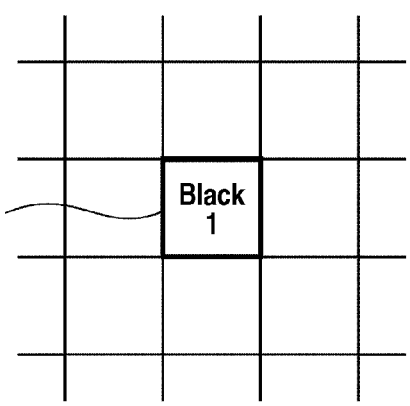
FIG. 16B illustrates an example of a state in which a pixel to be processed matches an achromatic color of the main histogram.

On the other hand, as illustrated in FIG. 16B, if a processing target pixel 660 matches the achromatic color in the main histogram, then the system controller 107 allocates zero point to the processing target pixel 660 (does not allocate a rating point to the processing target pixel 660).

Alternatively, it is also useful to employ the following configuration. More specifically, in this case, if the processing target pixel 650 matches the chromatic color in the main histogram, the system controller 107 allocates 2 rating points to the processing target pixel 650. On the other hand, in this case, if the processing target pixel 650 matches the achromatic color in the main histogram, the system controller 107 allocates 1 point, which is a rating point smaller than that allocated in the case of the chromatic color.

In step S503, the system controller 107 determines whether the pixel existing adjacent to the processing target pixel matches the pixel distributed in the adjacent histogram. More specifically, with respect to the pixel matching the main histogram, the system controller 107 determines whether eight pixels existing around a processing target pixel 610 match the adjacent histograms illustrated in FIGS. 10 and 11.

If it is determined that the pixel existing adjacent to the processing target pixel does not match the pixel distributed in the adjacent histogram (NO in step S503), then the processing advances to step S505. On the other hand, if it is determined that the pixel existing adjacent to the processing target pixel matches the pixel distributed in the adjacent histogram (YES in step S503), then the processing advances to step S504. In step S504, the system controller 107 allocates rating points to the location of the pixel.

Figure 16C:
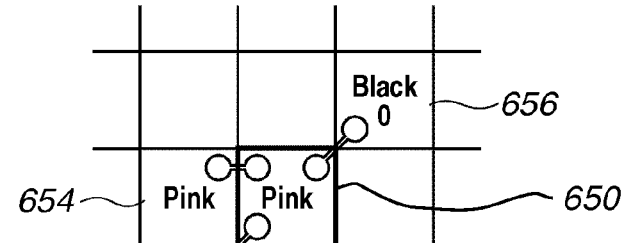
FIG. 16C illustrates an example of a state in which a pixel existing adjacent to the pixel to be processed that matches the chromatic color of the main histogram matches a chromatic color or an achromatic color included in the adjacent histogram.

More specifically, if, as illustrated in FIG. 16C, a chromatic color pixel 652, which is distributed in the adjacent histogram and having a hue different (i.e., green of the chromatic color pixel 652 vs. pink of a chromatic color pixel 650) from the hue of a chromatic color pixel matching the chromatic color in the main histogram exists adjacent to the chromatic color pixel, then the system controller 107 allocates 5 points.

On the other hand, if, as illustrated in FIG. 16C, a chromatic color pixel 654, which is distributed in the adjacent histogram and having the same hue (i.e., pink the chromatic color pixel 654 vs. pink of a chromatic color pixel 650) as the hue of a chromatic color pixel matching the chromatic color in the main histogram exists adjacent to the chromatic color pixel, then the system controller 107 allocates 4 points.

Furthermore, if, as illustrated in FIG. 16C, an achromatic color pixel 656, which is distributed in the adjacent histogram exists adjacent to the chromatic color pixel matching the chromatic color in the main histogram, then the system controller 107 allocates 3 points.

Figure 16D:
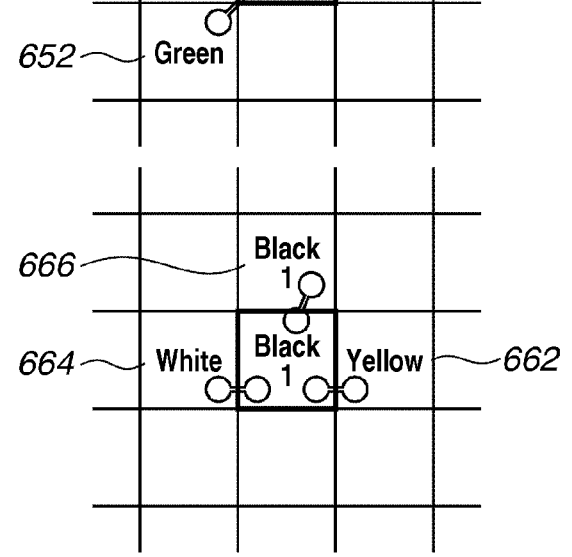
FIG. 16D illustrates an example of a state in which a pixel existing adjacent to the pixel to be processed that matches the achromatic color of the main histogram matches a chromatic color or an achromatic color included in the adjacent histogram.

On the other hand, if, as illustrated in FIG. 16D, a chromatic color pixel 662, which is distributed in the adjacent histogram exists adjacent to the chromatic color pixel matching the chromatic color in the main histogram, then the system controller 107 allocates 3 points.

Furthermore, if, as illustrated in FIG. 16D, an achromatic color pixel 664 having a luminance different from the luminance of an achromatic color pixel matching the achromatic color in the main histogram exists adjacent thereto, then the system controller 107 allocates 2 points. On the other hand, if, as illustrated in FIG. 16D, an achromatic color pixel 666 having the same luminance as the luminance of an achromatic color pixel matching the achromatic color in the main histogram exists adjacent thereto, then the system controller 107 allocates 2 points.

In determining whether a pixel existing adjacent to a processing target pixel matches any of the pixels distributed in the adjacent histograms illustrated in FIGS. 10 and 11, it is also useful if the determination is executed based on the hue only if the adjacent pixel is a chromatic color pixel. Alternatively, in this case, it is also useful if the determination is executed based on all of the hue, the saturation ("Chroma"), and the luminance Y.

In the examples illustrated in FIGS. 16A through 16D, the rating points to be allocated are changed according to the combination of the processing target pixel and the pixel existing adjacent thereto. However, it is also useful if the same rating points are allocated in all of the above-described cases. Furthermore, it is also useful if the rating points different from those described above are allocated.

In the tracking target object detection processing, the system controller 107 determines whether the processing target pixel matches any of the pixels distributed in the main histogram and whether a pixel existing adjacent to the processing target pixel matches any of the pixels distributed in the adjacent histogram.

In the above-described determination, the system controller 107 does not use information about the number of pixels included in the main histogram and the adjacent histogram. Accordingly, information about the number of pixels can be deleted from the main histogram and the adjacent histogram. More specifically, in the tracking target object detection processing, information about what attribute each pixel included in the tracking target area has and information about what attribute each pixel existing adjacent to each pixel included in the tracking target area has are necessary.

In other words, in the tracking target object detection processing, information about what attribute a pixel included in the tracking target area has and information about what attribute a pixel existing adjacent to each pixel included in the tracking target area has are necessary.

The classification data used in the tracking target object detection processing is not limited to the main histogram illustrated in FIGS. 6A and 6B and FIGS. 7A and 7B if the data can include the information described above. In addition, it is also useful if main classification data having a format different from that described above is used.

In addition, the adjacent classification data is not limited to the adjacent histogram illustrated in FIGS. 10 and 11. More specifically, it is also useful if adjacent classification data having a format different from that described above is used. More specifically, it is also useful if main classification data is generated and used, which indicates the type of the hue that the pixel existing inside the tracking target area has only instead of generating and using the main histogram illustrated in FIGS. 6A and 6B and FIGS. 7A and 7B.

Furthermore, it is also useful, instead of generating and using the adjacent histogram illustrated in FIG. 10 or 11, if the system controller 107 generates and uses adjacent classification data, which indicates the type of the hue that the pixel existing inside the tracking target area has and the type of the hue that each of all the pixels existing adjacent to the pixel has only.

As described above with reference to FIG. 15 and FIGS. 16A through 16D, in the present embodiment, the system controller 107 evaluates the relationship among the pixel to be processed that exists within the screen and the pixels existing adjacent to the pixel. In addition, the system controller 107 determines the matching status between the processing target pixel and the main histogram and the matching status between the adjacent pixel and the adjacent histogram. If it is determined that they match each other, the system controller 107 allocates rating points to the location of the evaluated pixel. In step S505, the system controller 107 determines whether the above-described processing has been completely executed on all the adjacent pixels.

If it is determined that the above-described processing has been completely executed on all the adjacent pixels (YES in step S505), then the processing advances to step S506. In step S506, the system controller 107 calculates an evaluation value for each location of the evaluated pixel by using the allocated rating points and the average luminance, average saturation, and average hue in each division unit in the main histogram, which have been stored in the manner described above with reference to FIGS. 6B and 7B.

More specifically, if the evaluated pixel is a chromatic color pixel, the system controller 107 uses the following expression (1) to calculate the evaluation value while if the evaluated pixel is an achromatic color pixel, the system controller 107 uses the following expression (2) to calculate the evaluation value:

$$EvaColor = \sum \frac{Point \times [K0]}{\Delta Hue(x, y) \times [K1] + \Delta Chroma(x, y) \times [K2] + \Delta Distance(x, y) \times [K3]} \quad (1)$$

$$EvaY = \sum \frac{Point \times [K0]}{\Delta Y(x, y) \times [K4] + \Delta Distance(x, y) \times [K3]} \quad (2)$$

where "ΔHue" denotes a difference between the hue of the evaluated pixel and the average hue, which has already been stored in the average histogram illustrated in FIGS. 6B and 7B, "Δchroma" denotes a difference between the saturation of the evaluated pixel and the average saturation previously stored in the average histogram illustrated in FIGS. 6B and 7B, "ΔY" denotes a difference between the luminance of the evaluated pixel and the average luminance previously stored in the average histogram illustrated in FIGS. 6B and 7B, and "Δdistance" denotes a distance between the location of the frame that indicates the location of the tracking target object displayed by the display device 105 and the location of the evaluated pixel. If the accuracy of detecting the tracking target object is extremely high, the distance "Δdistance" is either unnecessary or can be very small.

However, if a large number of pixels having the similar hue or luminance exist around the evaluated pixel, the phenomenon of hunting of the display of the frame, which may otherwise occur due to low accuracy of detecting a tracking target object, can be suppressed by adding a specific distance coefficient to the terms of the expressions (1) and (2).

In the expressions (1) and (2), terms of different unitary systems are added to each other. Accordingly, in order to keep the balance between them, coefficients "K0" through "K4" are used. Alternatively, in order to simplify the processing, it is also useful if a constant is used as the denominator of each of the expressions (1) and (2). This is because if the criterion of the determination in step S501 is set strict, the range of variation of the values of "ΔHue" and "ΔChroma" in the denominator of each of the expressions (1) and (2) becomes small.

In step S507, the system controller 107 determines whether the calculation of the evaluation value for all the pixels existing within the screen has been completed. If it is determined that the calculation of the evaluation value for all the pixels existing within the screen has not been completed (NO in step S507), then the processing returns to step S501. On the other hand, if it is determined that the calculation of the evaluation value for all the pixels existing within the screen has been completed (YES in step S507), then the processing advances to step S508.

In step S508, the system controller 107 uses the calculated evaluation value to identify the location of the tracking target object. More specifically, it is useful if the system controller 107 searches for a location at which the calculated evaluation value comes to its peak in the unit of a pixel and sets the location as the location of the tracking target object. In addition, it is useful if the system controller 107 searches for the location of an aggregate of pixels having an evaluation value higher than a predetermined value and sets the location of the aggregation of the pixels as the location of the tracking target object.

However, if the location at which the evaluation value reaches a specific value cannot be determined, i.e., if the location of the tracking target object cannot be identified by using the calculated evaluation value, then the system controller 107 does not identify the location of the tracking target object.

If the location of the tracking target object has been identified, then the system controller 107 determines the location for displaying the frame according to the identified location of the tracking target object. If the location of the tracking target object has not been identified, the system controller 107 does not determine the location for displaying the frame.

In the present embodiment, by executing the processing in steps S502, S504, and S506 described above, an example of an allocation unit is implemented. In addition, in the present embodiment, by executing the processing in steps S508 and S509, an example of a changing unit is implemented.

Figure 17:
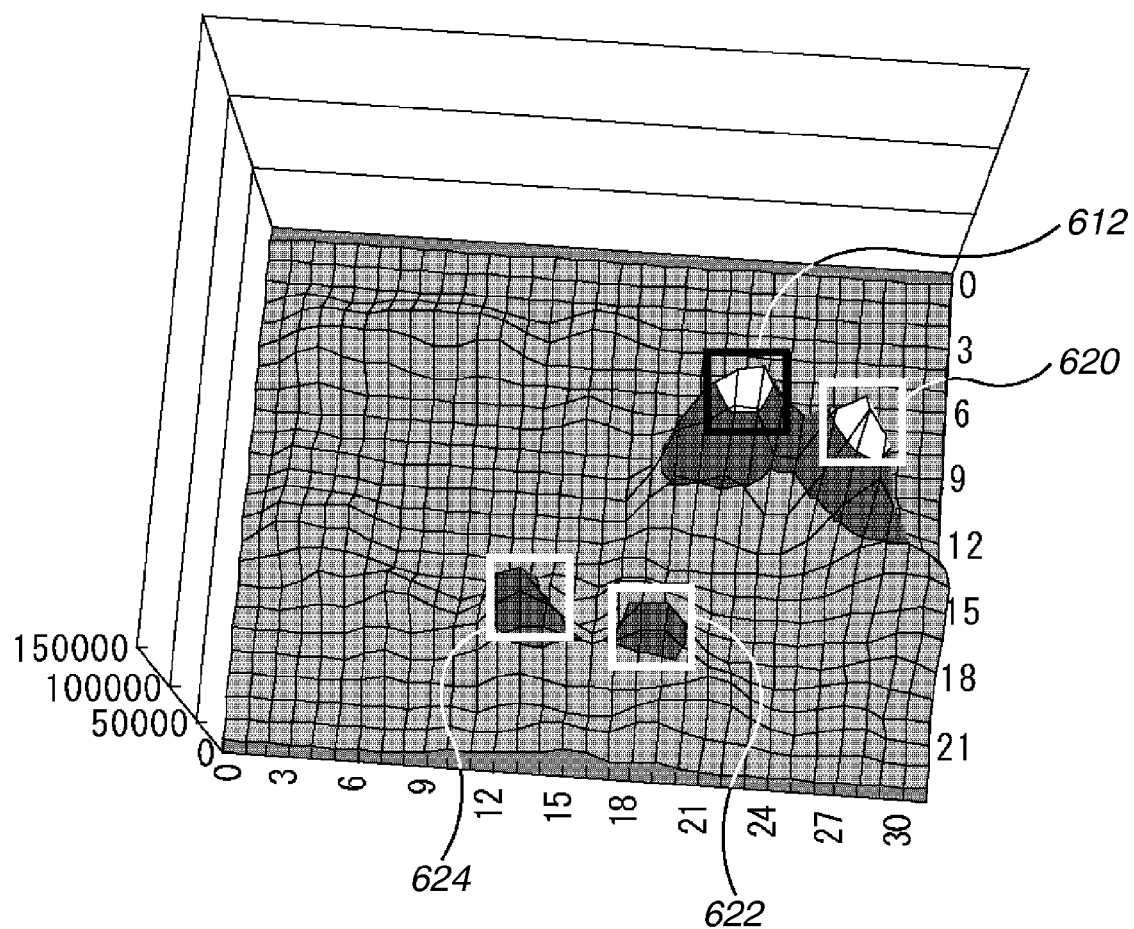
FIG. 17 illustrates an example of a result of calculation of an evaluation value.

FIG. 17 illustrates an example of a result of calculation of the evaluation value. In the example illustrated in FIG. 17, an evaluation value of the image illustrated in FIG. 2B in the case where the image has changed from the image illustrated in FIG. 2A to that illustrated in FIG. 2B is illustrated.

In the example illustrated in FIG. 17, coordinates of the image illustrated in FIG. 2B in the vertical direction and coordinates thereof in the horizontal direction are taken on the vertical axis and the horizontal axis, respectively. The evaluation value at each coordinate is taken on another axis perpendicular to a plane parallel to these axes.

In the example illustrated in FIG. 2A, the image at the time the tracking target object is determined is illustrated. The system controller 107 recognizes the portion inside the area 202 as the tracking target area. In addition, the system controller 107 generates the main histogram and the adjacent histogram thereof.

In the example illustrated in FIG. 2B, an image after the tracking target area has moved is illustrated. The evaluation value calculated in this state has the distribution illustrated in FIG. 17. As a result, the system controller 107 can display a frame that indicates the tracking target area in the area having a high evaluation value 612.

In the present embodiment, in the example illustrated in FIG. 17, a plurality of areas having high evaluation values 620, 622, and 624, which are different from the evaluation value 612, exists.

Suppose that a frame indicating the currently displayed tracking target area exists at the location having the evaluation value 620. The evaluation value 620 is lower than the evaluation value 612. Furthermore, the location of the pixel having the evaluation value 620 is closer to the pixel having the evaluation value 612. Accordingly, the frame may have already been displayed on the tracking target object.

Accordingly, in this case, it is also useful if the system controller 107 does not change the location of displaying the frame. More specifically, it is also useful if the frame is displayed at the location of the evaluation value 620 instead of changing the location to the location of the evaluation value 612.

Returning to FIG. 3, in step S108, the system controller 107 determines whether the tracking target area has been detected as a result of the processing in step S508 illustrated in FIG. 14. If it is determined that the tracking target area has been detected (YES in step S108), then the processing advances to step S109. In step S109, the system controller 107 displays the frame at the frame display location determined in step S509 in FIG. 14. Then, the processing returns to step S105.

On the other hand, if the tracking target area has not been detected (NO in step S108), then the processing advances to step S110. In step S110, the system controller 107 determines whether timeout has occurred (i.e., predetermined time has elapsed since a timing at which it is determined that the tracking target area has not been detected).

If it is determined that timeout has occurred (YES in step S110), then the processing illustrated in the flowchart of FIG. 3 ends. On the other hand, if it is determined that timeout has not occurred (NO in step S110), then the processing returns to step S105.

As described above, in the present embodiment, the system controller 107 generates a histogram (main histogram), which is main classification data for classifying pixels existing inside or outside the tracking target area. More specifically, for a chromatic color, the system controller 107 generates the hue histogram 400. For achromatic color, the system controller 107 generates the luminance histogram 440. In addition, for each pixel existing inside the tracking target area, the system controller 107 generates the histograms 500 and 520 (adjacent histograms), which is adjacent classification data for classifying the pixel existing adjacent to the pixel.

In detecting the tracking target object, if a pixel having an attribute corresponding to the attribute of a processing target pixel exists in the main histogram, then the system controller 107 increases the evaluation value of the processing target pixel. On the other hand, if a pixel having an attribute corresponding to the attribute of a pixel existing adjacent to the processing target pixel exists in the adjacent histogram, then the system controller 107 increases the evaluation value of the processing target pixel.

For the adjacent histogram, the present embodiment only determines the attribute of the pixel existing adjacent to the processing target pixel and does not determine the orientation of the adjacent pixel against the processing target pixel. Accordingly, if the orientation of the tracking target object is varied by rotation or if the attitude of the tracking apparatus (the imaging apparatus) in the vertical or horizontal direction itself has varied, the evaluation value may not be easily affected.

By using the adjacent histogram, the present embodiment determines the attribute of the pixel existing adjacent to each processing target pixel. Accordingly, the present embodiment can still improve the tracking performance even if the shape of the tracking target object itself has been deformed.

More specifically, if the face of a person looking straight ahead has been set as the tracking target object and if the tracking target object (the person's face) is oriented obliquely sideways, then the width of the image of the person's face is reduced. Accordingly, in this case, the shapes of the image of the person's face may be different from that at the timing at which the person's face has been set as the tracking target object.

In addition, if the face of a person looking straight ahead has been set as the tracking target object and if the person comes close to the tracking apparatus, the size of the image of the person's face may be different from that at the timing the person's face was set as the tracking target object.

One example focuses on three pixels, i.e., a pixel corresponding to the corner of the eye of a person, a pixel corresponding to an outer edge of the iris of the eye, and a pixel corresponding to the corner of the lips. In this example, if the orientation of the person's face is changed or if the person's face comes close to the tracking apparatus, the directional relationship among the three pixels and the relative distance among them have changed. However, in this case, it is easily understood that the amount of variation occurring among attributes of each pixel and those of the pixels existing adjacent to the pixel is small.

In the present embodiment, the system controller 107 executes the above-described calculation of the evaluation value for all the pixels included in the screen. Furthermore, the system controller 107 sets an area including a pixel having a high evaluation value as the tracking target area.

With the above-described configuration, the present embodiment can improve the tracking performance in a state where a conventional tracking method is not capable of executing an appropriate tracking operation.

In addition, it is not necessary for the present embodiment having the configuration described above to store a template image for tracking. Accordingly, the memory capacity can be saved. Furthermore, the present embodiment is capable of improving the tracking performance if the resolution of the image is low. Accordingly, the present embodiment does not require a high image processing performance.

Now, a second embodiment of the present invention will be described in detail below. In the present embodiment, the tracking target object is tracked by an interframe difference method if the method is available. On the other hand, in the present embodiment, if tracking by the interframe difference method is not available, the tracking target object is tracked in the manner similar to the manner described above in the first embodiment.

In other words, the present embodiment is different from the first embodiment described above in a point that the present embodiment uses the interframe difference method. The components of the present embodiment that are the same as those of the first embodiment are provided with the same reference numerals or symbols as those of the first embodiment described above with reference to FIGS. 1 through 17. Accordingly, the description thereof will not be repeated here.

Figure 18:
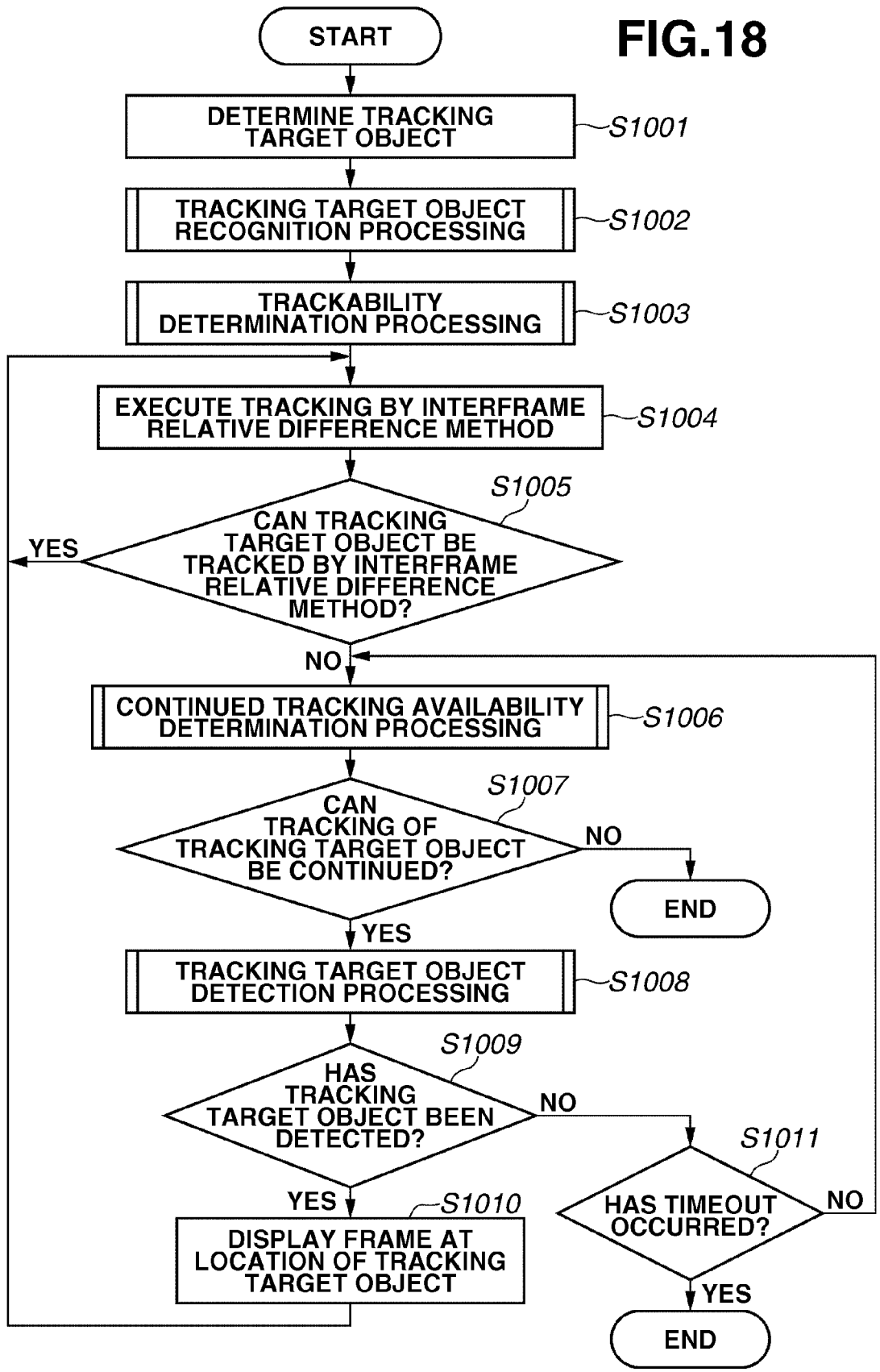
FIG. 18 is a flow chart illustrating an example of processing for tracking a tracking target object, which is executed by the imaging apparatus.

FIG. 18 is a main flow chart illustrating an example of processing for tracking a tracking target object, which is executed by the imaging apparatus according to the present embodiment.

Referring to FIG. 18, in step S1001, the system controller 107 determines the location and the size of the tracking target object. In step S1002, the system controller 107 executes the tracking target object recognition processing. In step S1003, the system controller 107 executes trackability determination processing. In steps S1001 through S1003, the system controller 107 executes the processing similar to that in steps S101 through S103 illustrated in the flow chart of FIG. 3.

In step S1004, the system controller 107 tracks the tracking target area by using the interframe relative difference method. During the interframe relative difference method, the system controller 107 uses image data existing at a designated tracking location as a template image and searches for an area to be subjected to pattern matching from a subsequent image frame.

In addition, the system controller 107 updates the image data existing at the location detected as the area to be subjected to pattern matching as a template image. Furthermore, the system controller 107 continues the search for the area to be subjected to pattern matching from the subsequent frame image.

As described above, in the present embodiment, the system controller 107 continues the tracking of the tracking target object from a subsequent frame image while serially updating the template images. When the interframe relative difference method is used, the pattern matching cannot be executed and it is determined that the tracking target object cannot be tracked in some cases.

Accordingly, in step S1005, the system controller 107 determines whether tracking by the interframe relative difference method is available. More specifically, if the orientation of the tracking target object has suddenly changed due to rotation thereof or if the attitude of the tracking apparatus itself in the vertical or horizontal direction has varied, and if pattern matching cannot be executed due to these causes, the tracking by the interframe relative difference method becomes unavailable.

If it is determined that tracking by the interframe relative difference method is available (YES in step S1005), then the processing returns to step S1004 and the system controller 107 continues the tracking of the tracking target object by the interframe relative difference method. On the other hand, if it is determined that the tracking by the interframe relative difference method is not available (NO in step S1005), then the processing advances to step S1006.

In this case, in step S1006, the system controller 107 executes continued tracking availability determination processing. In step S1007, the system controller 107 determines whether the tracking of the tracking target object can be continued. In step S1008, the system controller 107 executes tracking target object detection processing. More specifically, in step S1009, the system controller 107 determines whether the tracking target object has been detected.

If it is determined that the tracking target object has been detected (YES in step S1009), then the processing advances to step S1010. In step S1010, the system controller 107 displays the frame at the frame display location. Then, the processing returns to step S1004.

In step S1004, the system controller 107 resumes the tracking of the tracking target object by the interframe relative difference method from the tracking target area detected in step S1008. On the other hand, if the tracking target area has not been detected, then the processing advances to step S1011. In step S1011, the system controller 107 determines whether timeout has occurred. If it is determined that timeout has occurred (YES in step S1011), then the processing according to the flow chart of FIG. 18 ends. On the other hand, if it is determined that timeout has not occurred (NO in step S1011), then the processing returns to step S1006.

The processing in steps S1006 through S1011 is similar to the processing insteps S105 through S110 illustrated in the flow chart of FIG. 3.

As described above, in the processing according to the flow chart illustrated in FIG. 18, the tracking by the interframe relative difference method and the tracking described above in the first embodiment are not simultaneously executed. However, the present invention is not limited to this. More specifically, it is also useful if both processing is simultaneously executed in parallel to each other. In this case, the system controller 107 determines which of the processing has a high accuracy and uses the result of the processing whose accuracy is higher to execute the tracking of the tracking target object. In addition, it is also useful if any other tracking method, such as those described above in Description of the Related Art, is used instead of the interframe relative difference method.

Furthermore, the present invention can also be achieved by providing a system or a device with a storage medium (or a recording medium) which stores program code of software implementing the functions of the embodiments and by reading and executing the program code stored in the storage medium with a computer of the system or the device (a CPU or an MPU). In this case, the program code itself, which is read from the storage medium, implements the functions of the embodiments mentioned above. In addition, the program that implements an embodiment of the present invention can be stored on a computer-readable storage medium.

While the present invention has been described with reference to embodiments, it is to be understood that the invention is not limited to the disclosed embodiments. The scope of the following claims is to be accorded the broadest interpretation so as to encompass all modifications, equivalent structures, and functions.

What is claimed is:

1. An apparatus comprising:
  a storage unit configured to store a first attribute of each pixel existing inside a tracking target area set on an image and a second attribute of a pixel existing adjacent to the pixel as adjacent classification data;
  an allocation unit configured to allocate an evaluation value to a pixel to be evaluated according to a result of comparison between an attribute of the pixel to be evaluated and the first attribute of a pixel existing inside the tracking target area and a result of comparison between an attribute of a pixel existing adjacent to the pixel to be evaluated and the second attribute of a pixel existing adjacent to the pixel existing inside the tracking target area; and
  a changing unit configured to change the tracking target area based on the allocated evaluation value,
  wherein the allocation unit is configured, if a pixel corresponding to at least one piece of a first attribute and at least one piece of a second attribute is registered in the adjacent classification data and the pixel to be evaluated is a chromatic color pixel, to allocate high evaluation values to the pixel to be evaluated in descending order of a case where the pixel existing adjacent to the pixel to be evaluated is a chromatic color pixel having a hue different from a hue of the pixel to be evaluated, a case where the pixel existing adjacent to the pixel to be evaluated is a chromatic color pixel having the same hue as the pixel to be evaluated, and a case where the pixel existing adjacent to the pixel to be evaluated is an achromatic color pixel.

2. The apparatus according to claim 1, wherein the storage unit includes:
  a main classification unit configured to generate and store, on the storage unit, main classification data, which is data classified according to a predetermined unit of classification in the first attribute as data of classification of each pixel existing inside the tracking target area; and
  an adjacent classification unit configured to generate and store, on the storage unit, the adjacent classification data, which is data classified according to the predetermined unit of classification in the first attribute and a predetermined unit of classification in the second attribute as data of classification of a pixel existing adjacent to each pixel existing inside the tracking target area,
  wherein the allocation unit is configured to allocate an evaluation value to the pixel to be evaluated if a pixel corresponding to at least one piece of the first attribute is registered in the main classification data and if a pixel corresponding to at least one piece of the first attribute and at least one piece of the second attribute is registered in the adjacent classification data.

3. An apparatus comprising:
  a storage unit configured to store a first attribute of each pixel existing inside a tracking target area set on an image and a second attribute of a pixel existing adjacent to the pixel as adjacent classification data;

an allocation unit configured to allocate an evaluation value to a pixel to be evaluated according to a result of comparison between an attribute of the pixel to be evaluated and the first attribute of a pixel existing inside the tracking target area and a result of comparison between an attribute of a pixel existing adjacent to the pixel to be evaluated and the second attribute of a pixel existing adjacent to the pixel existing inside the tracking target area; and a changing unit configured to change the tracking target area based on the allocated evaluation value, wherein the allocation unit is configured, if a pixel corresponding to at least one piece of a first attribute and at least one piece of a second attribute is registered in the adjacent classification data and the pixel to be evaluated is an achromatic color pixel, to allocate high evaluation values to the pixel to be evaluated in descending order of a case where the pixel existing adjacent to the pixel to be evaluated is a chromatic color pixel, a case where the pixel existing adjacent to the pixel to be evaluated is an achromatic color pixel having a luminance different from a luminance of the pixel to be evaluated, and a case where the pixel existing adjacent to the pixel to be evaluated is an achromatic color pixel having the same luminance level as the pixel to be evaluated.

4. The apparatus according to claim 2, wherein if the pixel to be evaluated is a chromatic color pixel, the first attribute is hue, and if the pixel to be evaluated is an achromatic color pixel, the first attribute is luminance.

5. The apparatus according to claim 2, wherein if the pixel existing adjacent to the pixel to be evaluated is a chromatic color pixel, the second attribute is hue, saturation, and luminance, and if the pixel existing adjacent to the pixel to be evaluated is an achromatic color pixel, the second attribute is luminance.

6. The apparatus according to claim 2, wherein the main classification data is a histogram classified according to the predetermined unit of classification in the first attribute, and the adjacent classification data is a histogram classified according to the predetermined unit of classification in the first attribute and the predetermined unit of classification in the second attribute.

7. A method comprising:
storing a first attribute of each pixel existing inside a tracking target area set on an image and a second attribute of a pixel existing adjacent to the pixel as adjacent classification data;

allocating an evaluation value to a pixel to be evaluated according to a result of comparison between an attribute of the pixel to be evaluated and the first attribute of a pixel existing inside the tracking target area and a result of comparison between an attribute of a pixel existing adjacent to the pixel to be evaluated and the second attribute of a pixel existing adjacent to the pixel existing inside the tracking target area;

changing the tracking target area based on the allocated evaluation value;

if a pixel corresponding to at least one piece of a first attribute and at least one piece of a second attribute is registered in the adjacent classification data and the pixel to be evaluated is a chromatic color pixel, to allocate high evaluation values to the pixel to be evaluated in descending order of a case where the pixel existing adjacent to the pixel to be evaluated is a chromatic color pixel having a hue different from a hue of the pixel to be evaluated, a case where the pixel existing adjacent to the pixel to be evaluated is a chromatic color pixel having the same hue as the pixel to be evaluated, and a case where the pixel existing adjacent to the pixel to be evaluated is an achromatic color pixel.

8. The method according to claim 7, further comprising:
generating and storing, on a storage medium, main classification data, which is data classified according to a predetermined unit of classification in the first attribute as data of classification of each pixel existing inside the tracking target area; and generating and storing, on a storage medium, adjacent classification data, which is data classified according to the predetermined unit of classification in the first attribute and a predetermined unit of classification in the second attribute as data of classification of a pixel existing adjacent to each pixel existing inside the tracking target area;

allocating an evaluation value to the pixel to be evaluated if a pixel corresponding to at least one piece of the first attribute is registered in the main classification data and if a pixel corresponding to at least one piece of the first attribute and at least one piece of the second attribute is registered in the adjacent classification data.

9. The method according to claim 8, wherein if the pixel to be evaluated is a chromatic color pixel, the first attribute is hue, and if the pixel to be evaluated is an achromatic color pixel, the first attribute is luminance.

10. The method according to claim 8, wherein if the pixel existing adjacent to the pixel to be evaluated is a chromatic color pixel, the second attribute is hue, saturation, and luminance, and if the pixel existing adjacent to the pixel to be evaluated is an achromatic color pixel, the second attribute is luminance.

11. The method according to claim 8, wherein the main classification data is a histogram classified according to the predetermined unit of classification in the first attribute, and the adjacent classification data is a histogram classified according to the predetermined unit of classification in the first attribute and the predetermined unit of classification in the second attribute.

12. A non-transitory computer-readable storage medium storing a program for causing a computer of an apparatus to perform a method comprising:
storing a first attribute of each pixel existing inside a tracking target area set on an image and a second attribute of a pixel existing adjacent to the pixel as adjacent classification data;

allocating an evaluation value to a pixel to be evaluated according to a result of comparison between an attribute of the pixel to be evaluated and the first attribute of a pixel existing inside the tracking target area and a result of comparison between an attribute of a pixel existing adjacent to the pixel to be evaluated and the second attribute of a pixel existing adjacent to the pixel existing inside the tracking target area;

changing the tracking target area based on the allocated evaluation value; and if a pixel corresponding to at least one piece of a first attribute and at least one piece of a second attribute is registered in the adjacent classification data and the pixel to be evaluated is a chromatic color pixel, to allocate high evaluation values to the pixel to be evaluated in descending order of a case where the pixel existing adjacent to the pixel to be evaluated is a chromatic color pixel having a hue different from a hue of the pixel to be evaluated, a case where the pixel existing adjacent to the pixel to be evaluated is a chromatic color pixel having the same hue as the pixel to be evaluated, and a case where the pixel existing adjacent to the pixel to be evaluated is an achromatic color pixel.

13. The non-transitory computer-readable storage medium according to claim 12, further comprising:
   generating and storing, on a storage medium, main classification data, which is data classified according to a predetermined unit of classification in the first attribute as data of classification of each pixel existing inside the tracking target area; and
   generating and storing, on a storage medium, adjacent classification data, which is data classified according to the predetermined unit of classification in the first attribute and a predetermined unit of classification in the second attribute as data of classification of a pixel existing adjacent to each pixel existing inside the tracking target area;
   allocating an evaluation value to the pixel to be evaluated if a pixel corresponding to at least one piece of the first attribute is registered in the main classification data and if a pixel corresponding to at least one piece of the first attribute and at least one piece of the second attribute is registered in the adjacent classification data.

14. The non-transitory computer-readable storage medium according to claim 13, wherein if the pixel to be evaluated is a chromatic color pixel, the first attribute is hue, and if the pixel to be evaluated is an achromatic color pixel, the first attribute is luminance.

15. The non-transitory computer-readable storage medium according to claim 13, wherein if the pixel existing adjacent to the pixel to be evaluated is a chromatic color pixel, the second attribute is hue, saturation, and luminance, and if the pixel existing adjacent to the pixel to be evaluated is an achromatic color pixel, the second attribute is luminance.

16. The non-transitory computer-readable storage medium according to claim 13, wherein the main classification data is a histogram classified according to the predetermined unit of classification in the first attribute, and the adjacent classification data is a histogram classified according to the predetermined unit of classification in the first attribute and the predetermined unit of classification in the second attribute.

17. A method comprising:
   storing a first attribute of each pixel existing inside a tracking target area set on an image and a second attribute of a pixel existing adjacent to the pixel as adjacent classification data;
   allocating an evaluation value to a pixel to be evaluated according to a result of comparison between an attribute of the pixel to be evaluated and the first attribute of a pixel existing inside the tracking target area and a result of comparison between an attribute of a pixel existing adjacent to the pixel to be evaluated and the second attribute of a pixel existing adjacent to the pixel existing inside the tracking target area;
   changing the tracking target area based on the allocated evaluation value; and
   if a pixel corresponding to at least one piece of a first attribute and at least one piece of a second attribute is registered in the adjacent classification data and the pixel to be evaluated is an achromatic color pixel, to allocate high evaluation values to the pixel to be evaluated in descending order of a case where the pixel existing adjacent to the pixel to be evaluated is a chromatic color pixel, a case where the pixel existing adjacent to the pixel to be evaluated is an achromatic color pixel having a luminance different from a luminance of the pixel to be evaluated, and a case where the pixel existing adjacent to the pixel to be evaluated is an achromatic color pixel having the same luminance level as the pixel to be evaluated.

18. A non-transitory computer-readable storage medium storing a program for causing a computer of an apparatus to perform a method comprising:
   storing a first attribute of each pixel existing inside a tracking target area set on an image and a second attribute of a pixel existing adjacent to the pixel as adjacent classification data;
   allocating an evaluation value to a pixel to be evaluated according to a result of comparison between an attribute of the pixel to be evaluated and the first attribute of a pixel existing inside the tracking target area and a result of comparison between an attribute of a pixel existing adjacent to the pixel to be evaluated and the second attribute of a pixel existing adjacent to the pixel existing inside the tracking target area;
   changing the tracking target area based on the allocated evaluation value; and
   if a pixel corresponding to at least one piece of a first attribute and at least one piece of a second attribute is registered in the adjacent classification data and the pixel to be evaluated is an achromatic color pixel, to allocate high evaluation values to the pixel to be evaluated in descending order of a case where the pixel existing adjacent to the pixel to be evaluated is a chromatic color pixel, a case where the pixel existing adjacent to the pixel to be evaluated is an achromatic color pixel having a luminance different from a luminance of the pixel to be evaluated, and a case where the pixel existing adjacent to the pixel to be evaluated is an achromatic color pixel having the same luminance level as the pixel to be evaluated.

* * * * *